United States Patent
Maeda et al.

(10) Patent No.: US 7,961,392 B2
(45) Date of Patent: Jun. 14, 2011

(54) POLARIZATION BEAM SPLITTER AND POLARIZATION CONVERSION ELEMENT

(75) Inventors: Ikuo Maeda, Kanagawa (JP); Kazusi Shibata, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 736 days.

(21) Appl. No.: 11/961,611

(22) Filed: Dec. 20, 2007

(65) Prior Publication Data

US 2008/0158673 A1 Jul. 3, 2008

(30) Foreign Application Priority Data

Dec. 28, 2006 (JP) ................... 2006-356390
Oct. 12, 2007 (JP) ................... 2007-266540

(51) Int. Cl.
*G02B 5/30* (2006.01)
(52) U.S. Cl. .................. 359/485.03
(58) Field of Classification Search .......... None
See application file for complete search history.

(56) References Cited

U.S. PATENT DOCUMENTS

| | | |
|---|---|---|
| 6,351,296 B1 | 2/2002 | Pilossof et al. |
| 6,394,607 B1 | 5/2002 | Hashizume et al. |
| 6,542,298 B1 | 4/2003 | Aoki |
| 6,623,121 B2 * | 9/2003 | Sato ................. 353/20 |
| 2004/0061937 A1 | 4/2004 | Masubuchi et al. |
| 2004/0145807 A1 | 7/2004 | Stark |
| 2005/0068622 A1 | 3/2005 | Hatano |

FOREIGN PATENT DOCUMENTS

| | | |
|---|---|---|
| CN | 1278606 A | 1/2001 |
| DE | 102 47 004 A1 | 4/2004 |
| EP | 1 491 921 A1 | 12/2004 |
| JP | 11-211916 | 8/1999 |

OTHER PUBLICATIONS

Optilayer Ltd.: "Features of OptilLayer Software Familiy", XP002579201, Retrieved from the Internet: URL : http://www.optilayer.com/features.htm>[retrieved on Apr. 21, 2010], 6 pages.
Huang Yuyong, "Appliance of Optical Thin Film in Projection Display and Light Switch", Basic Science Part of Chinese Selected Doctoral Dissertations and Master's Theses Full-Text Databases, the first edition, Mar. 15, 2003, pp. 28-30 with 3 additional pages.

* cited by examiner

*Primary Examiner* — Lee Fineman
(74) *Attorney, Agent, or Firm* — Oblon, Spivak, McClelland, Maier & Neustadt, L.L.P.

(57) ABSTRACT

A disclosed polarization beam splitter is effective when light to undergo polarization-splitting has an incidence angle that falls in a range of 54 degrees through 66 degrees. The polarization beam splitter includes, between two transparent substrates, an adhesive layer configured to adhere to a first transparent substrate of the two transparent substrates, two or more types of dielectric multilayer films having different design basis wavelengths, and a single-layer dielectric film. The dielectric multilayer films and the single-layer dielectric film form a polarization split film, which performs a polarization split function with respect to light that is substantially in the visible wavelength region.

15 Claims, 25 Drawing Sheets

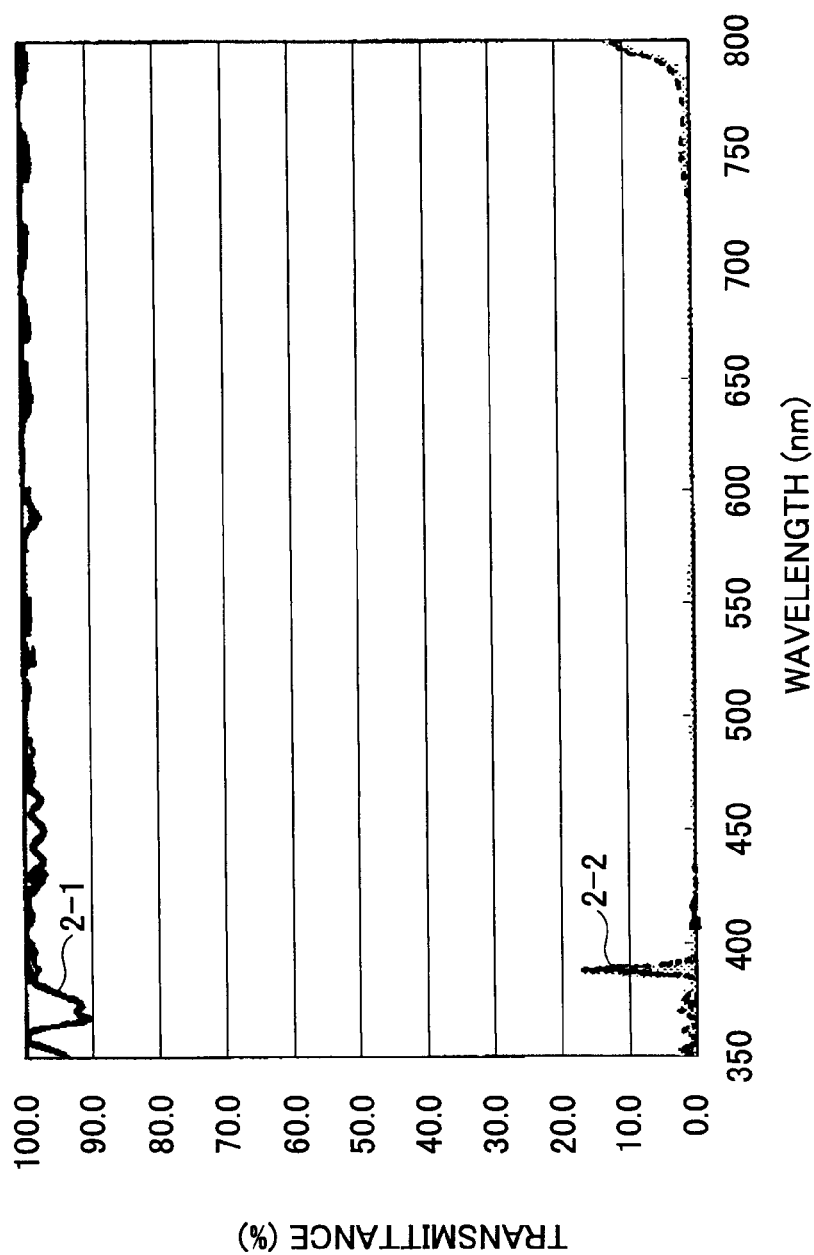

POLARIZATION SPLIT FILM 45L
HIGH REFRACTIVE INDEX n=2.086 (INCIDENCE ANGLE=60°)

POLARIZATION SPLIT FILM 45L
HIGH REFRACTIVE INDEX n=2.336 (INCIDENCE ANGLE=60°)

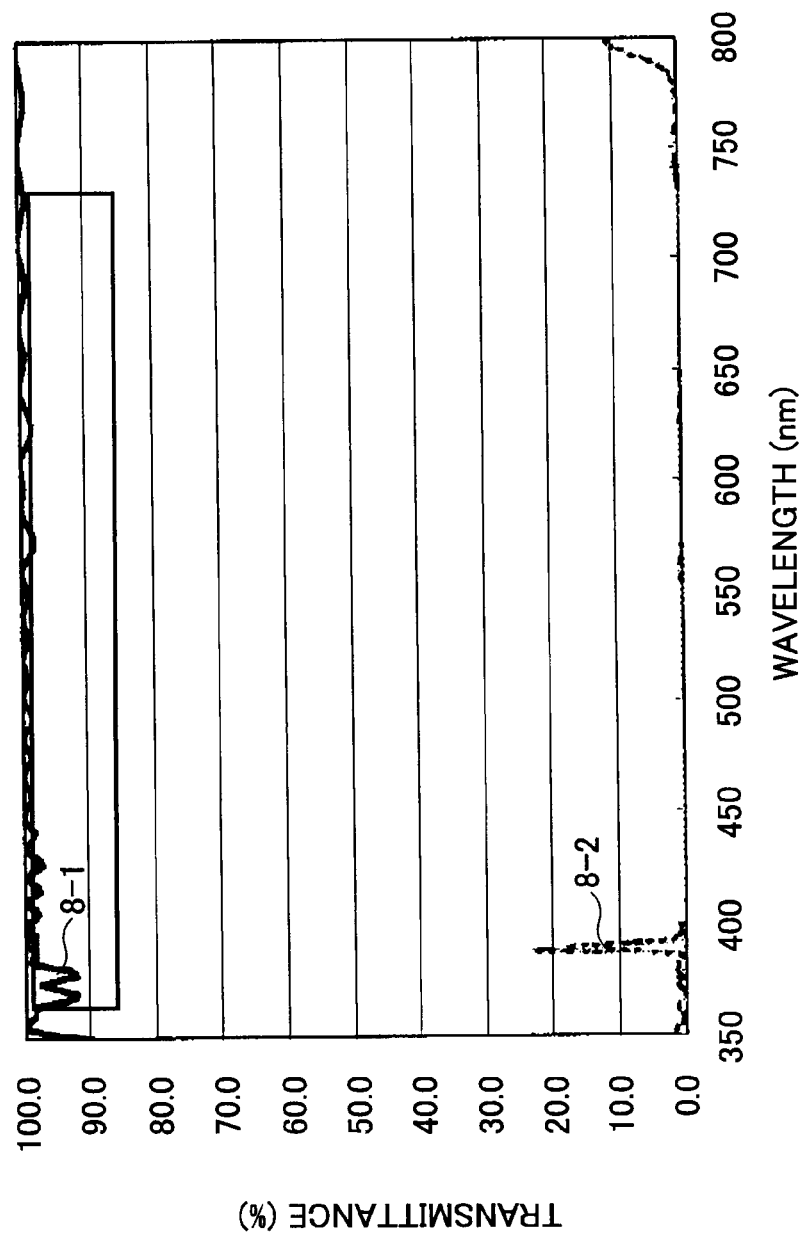

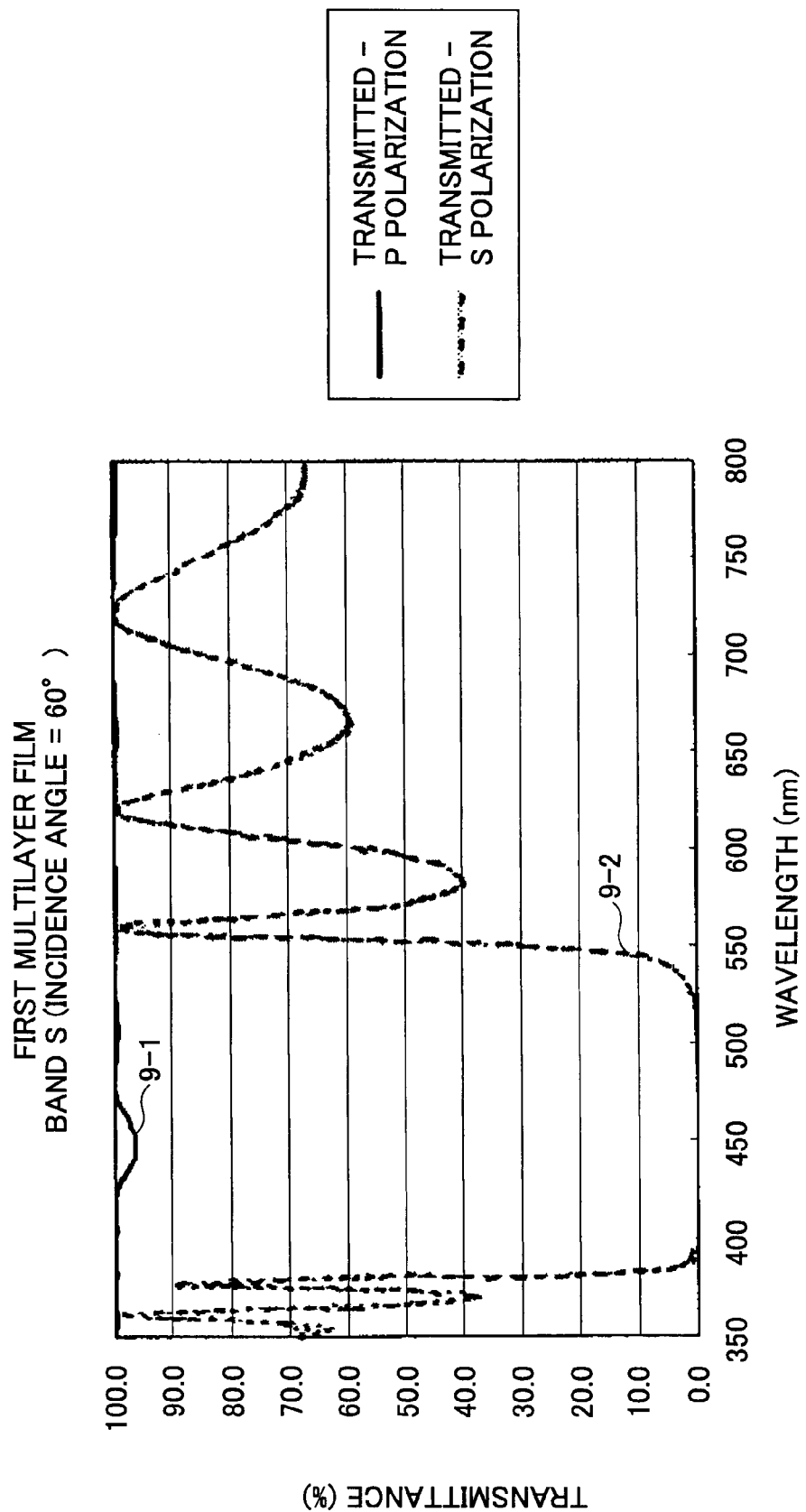

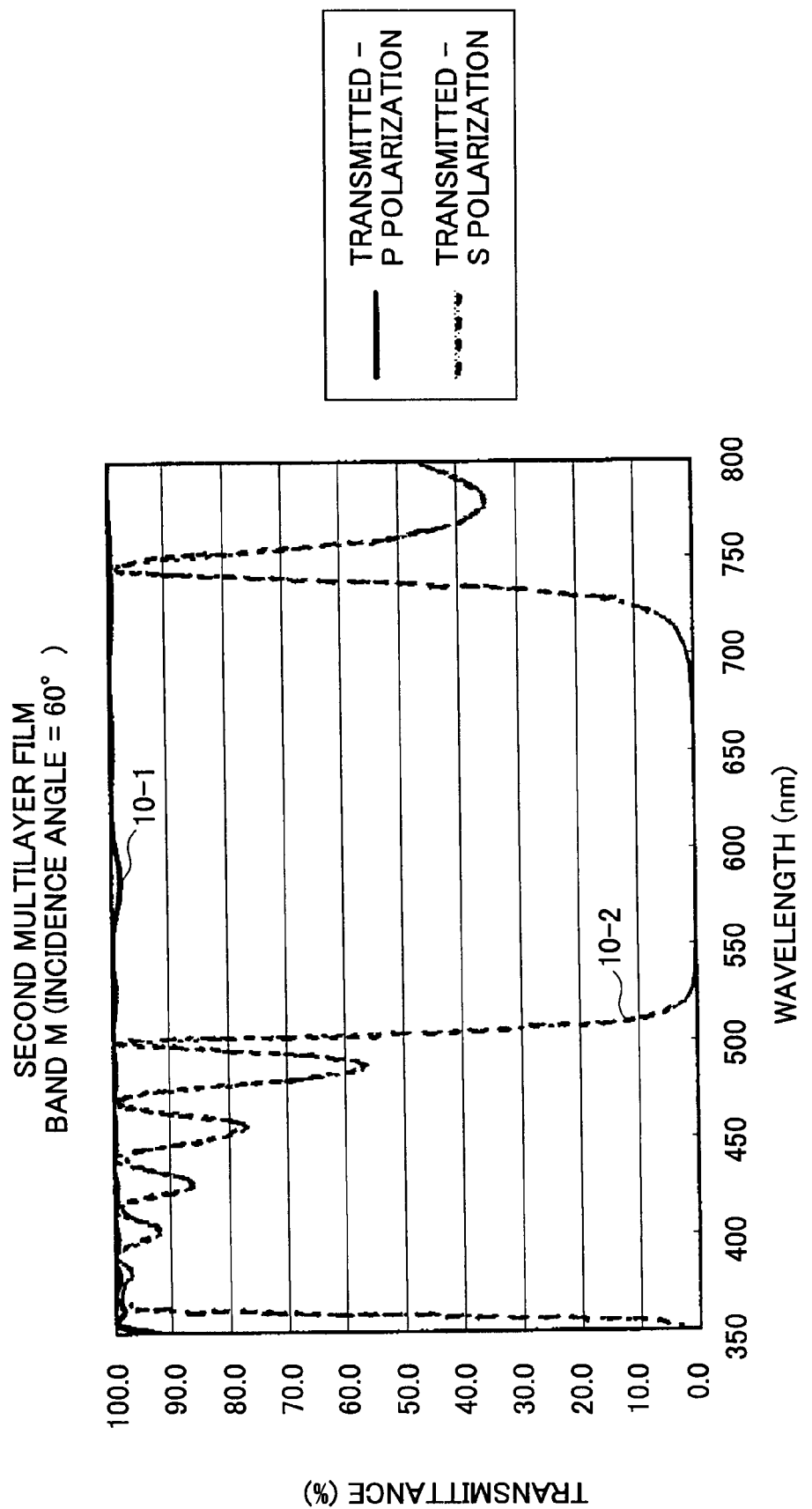

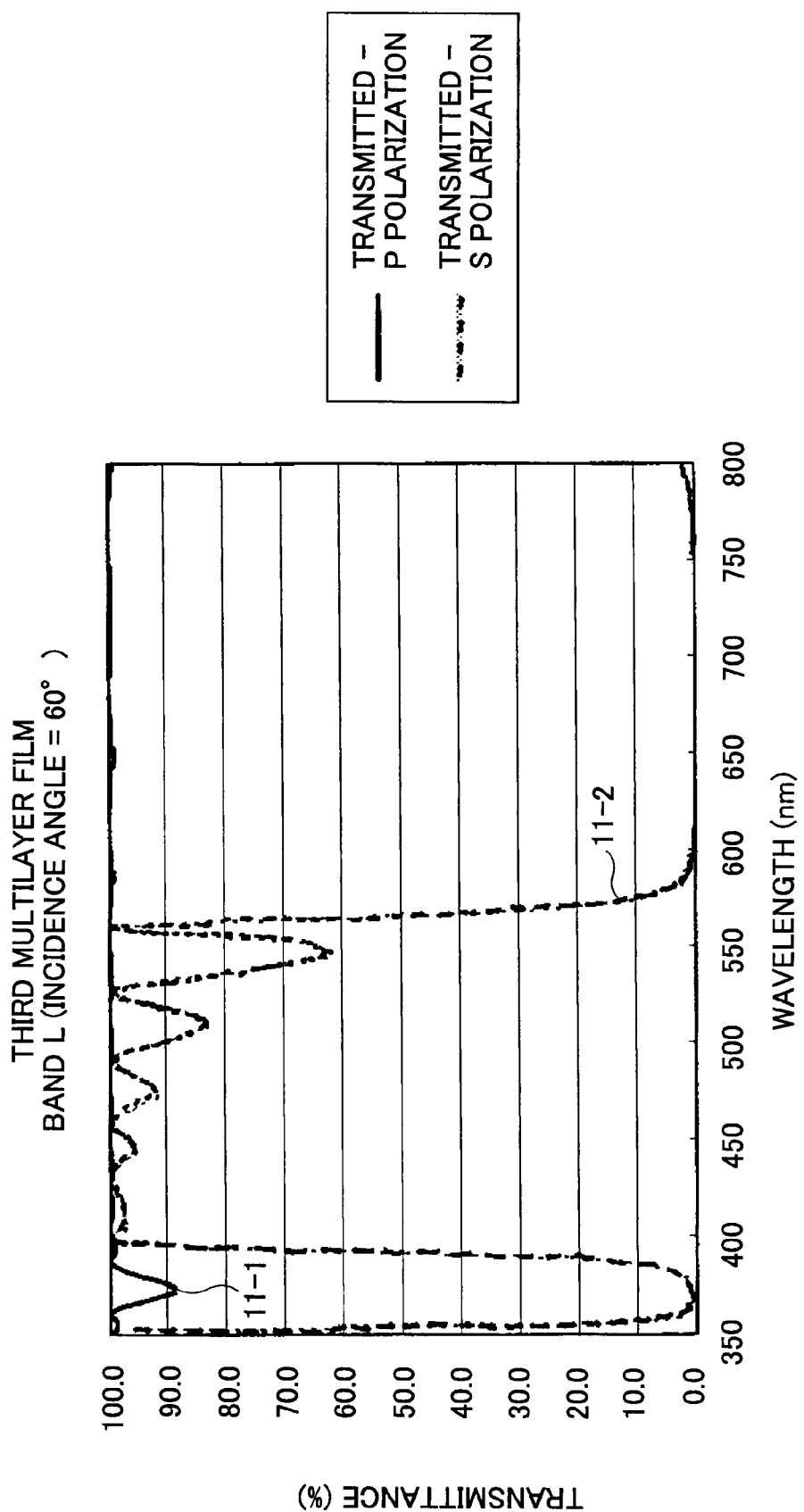

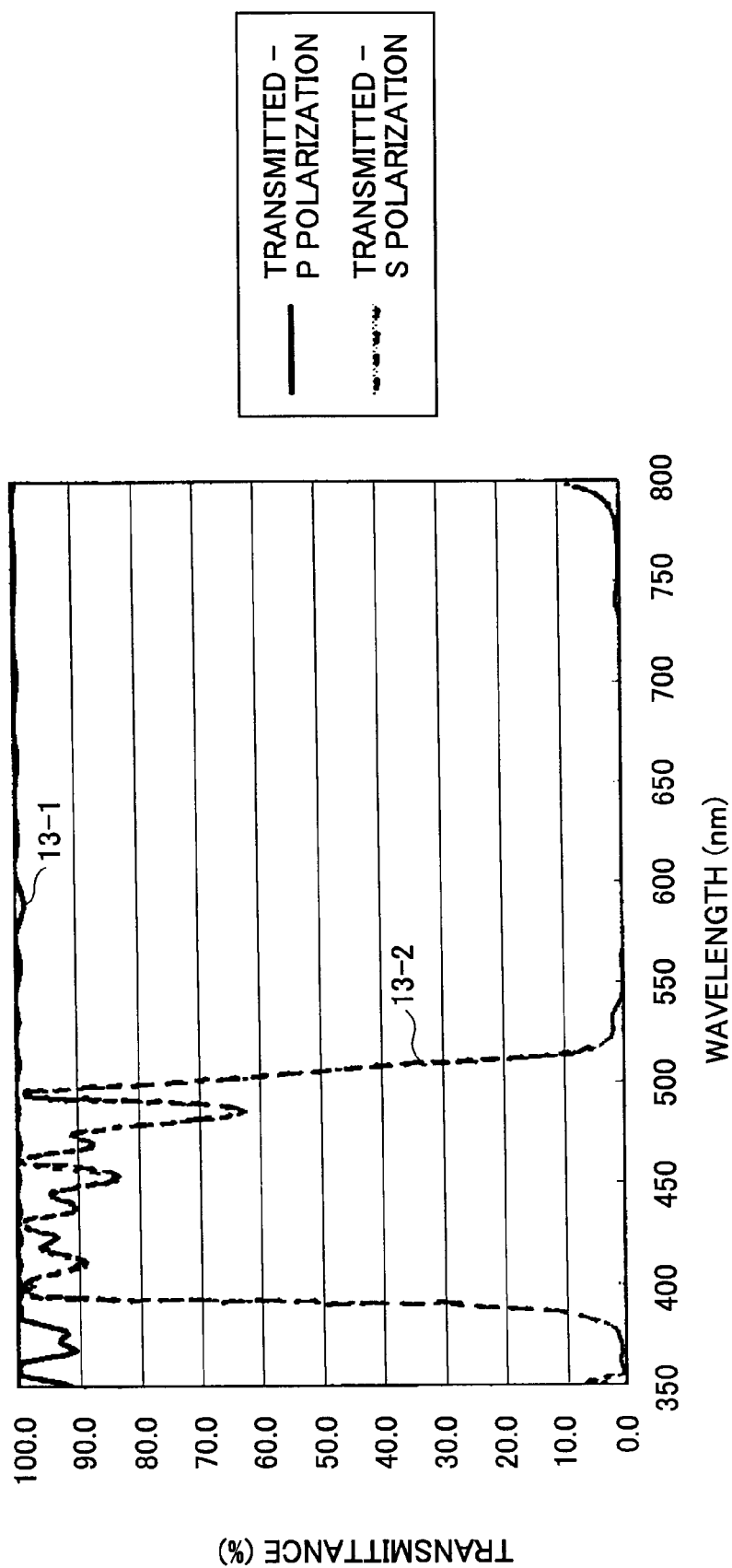

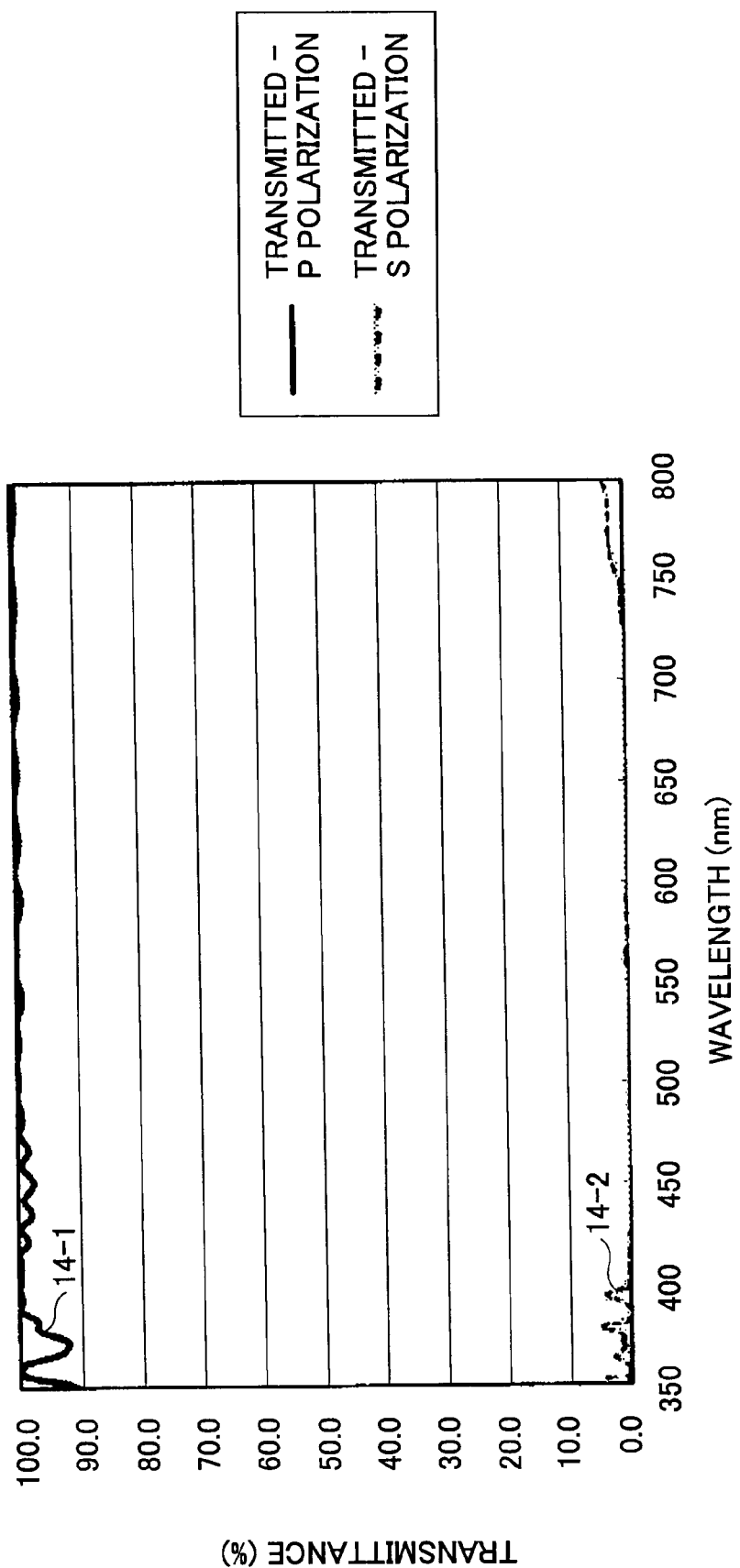

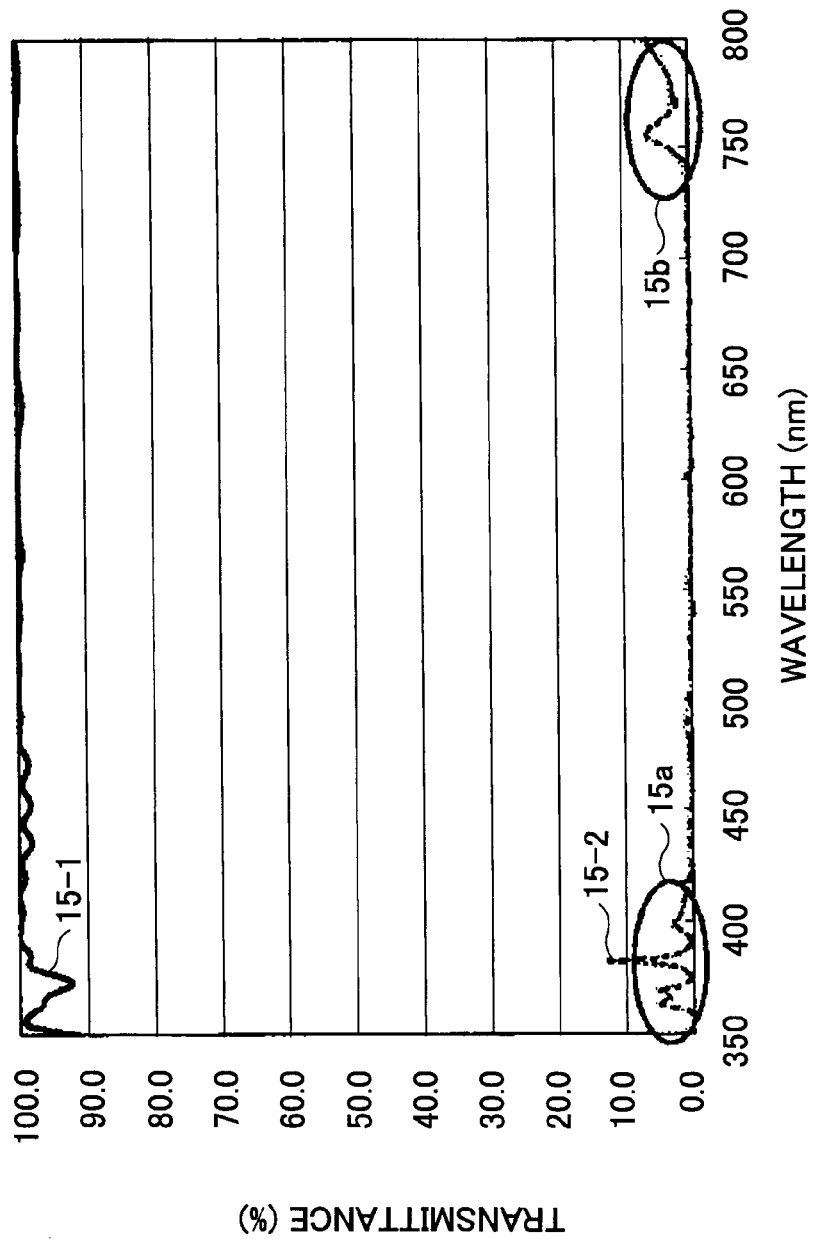

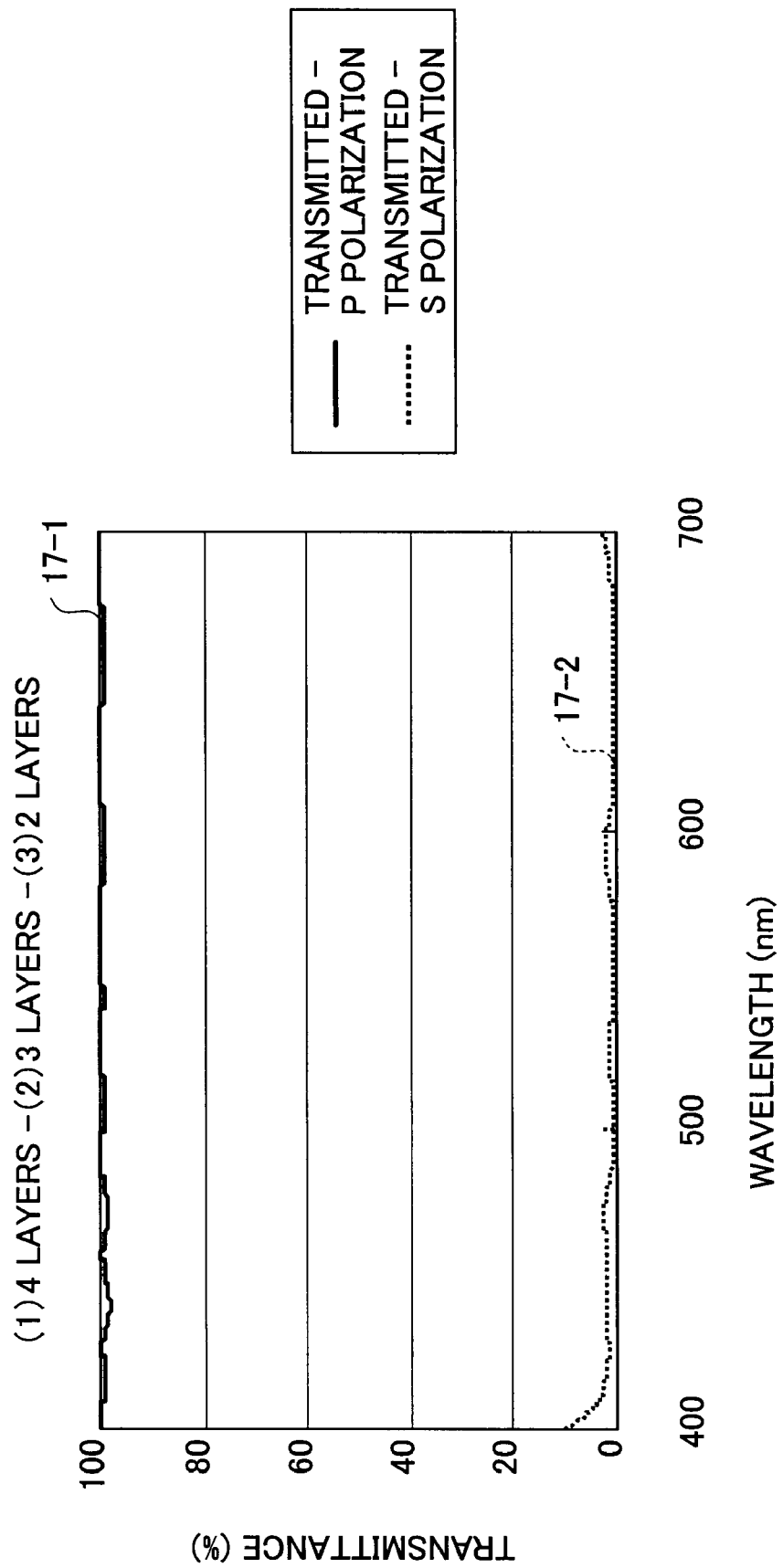

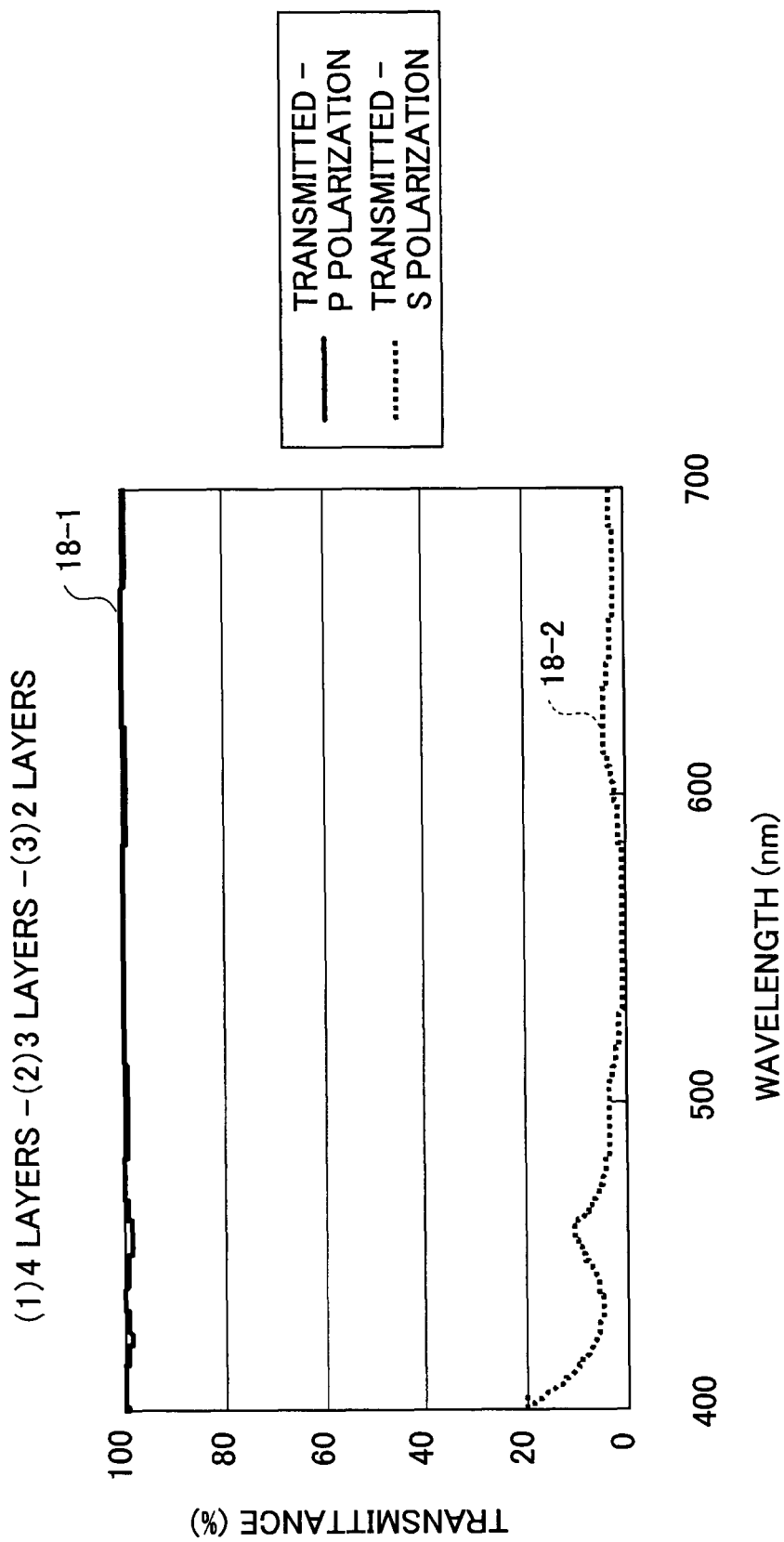

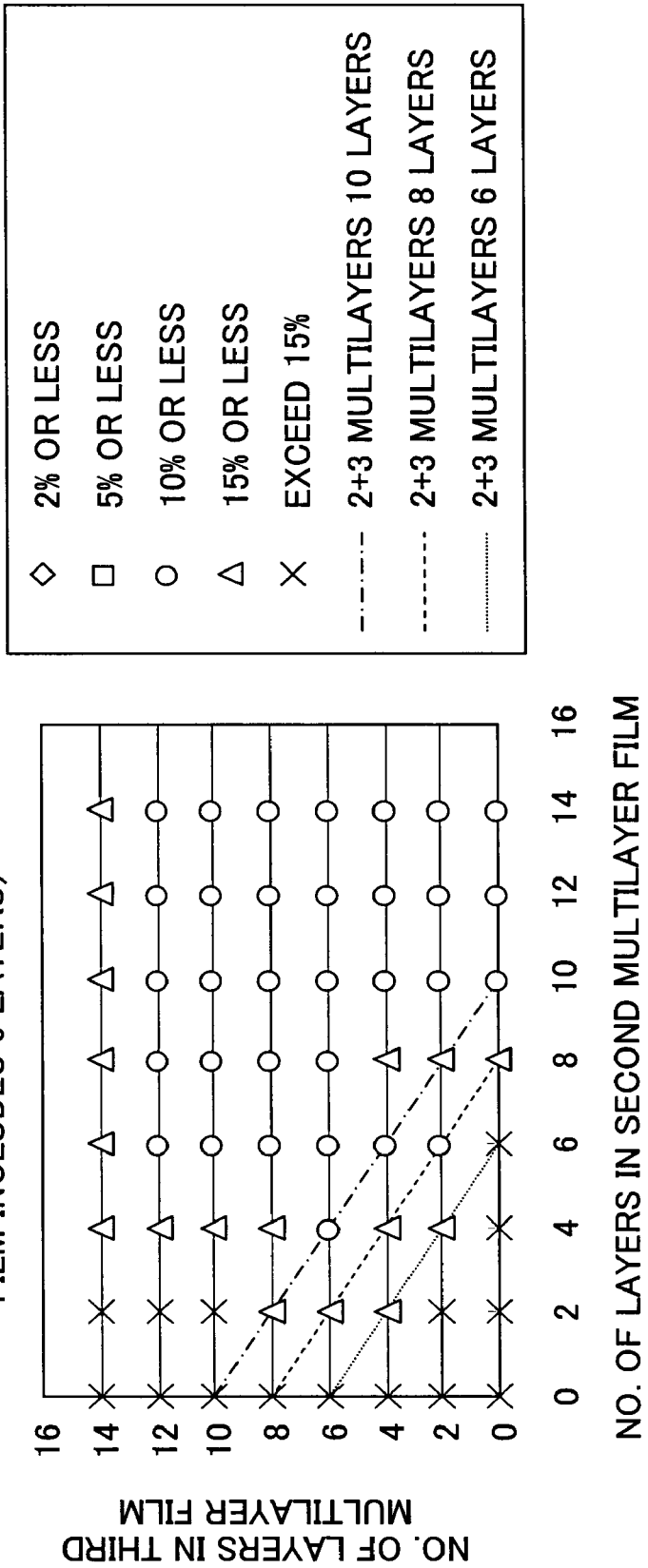

POLARIZATION BEAM SPLITTER AND POLARIZATION CONVERSION ELEMENT

BACKGROUND OF THE INVENTION

1. Field of the Invention

The present invention relates to a polarization beam splitter and a polarization conversion element.

2. Description of the Related Art

A polarization beam splitter typically includes a polarization split film sandwiched between a pair of transparent substrates. The polarization beam splitter is an optical element for splitting incident light into transmitted light and reflected light having polarization planes that are orthogonal to each other. The polarization beam splitter is used in various types of optical devices.

When the polarization beam splitter is used in an optical device using monochromatic light such as an optical pickup, favorable polarization-splitting properties can be realized relatively easily. However, when the polarization beam splitter is used as a polarization conversion element in a liquid crystal projector, it is required to have favorable polarization-splitting properties across the visible wavelength region.

Patent Document 1 discloses a polarization beam splitter in which a polarization split film is formed as a dielectric multilayer film and that realizes favorable polarization-splitting properties over the visible wavelength region.

In the polarization beam splitter disclosed in Patent Document 1, dielectric multilayer films are provided between two transparent substrates. Each dielectric multilayer film is formed by alternately vapor-depositing a high refractive index substance and a low-refractive index substance. The dielectric multilayer films are two dielectric multilayer films corresponding to different design basis wavelengths. The two dielectric multilayer films have different combinations of high refractive index substances and low-refractive index substances. The high refractive index substances in the two dielectric multilayer films both have a refractive index of 2.6 or more.

According to a specific embodiment in Patent Document 1, favorable polarization-splitting properties are realized. Specifically, with respect to light with an incidence angle range of 45 degrees ±2 degrees, in a wavelength range of 410 nm through 700 nm, the transmittance of a P polarization component is 80% or more and the transmittance of an S polarization component is substantially 0%.

The embodiment described in Patent Document 1 does not specify the number of laminated layers in each dielectric multilayer film of the polarization split film. The inventors of the present invention designed a film according to the contents of the invention disclosed in Patent Document 1. When the number of laminated layers was around 60, the transmittance of a P polarization component was 80% or more with respect light in a wavelength range of 400 nm through 700 nm. However, the transmittance of an S polarization component was around 15% with respect to light in a wavelength range of 400 nm through 700 nm, which is insufficient in terms of polarization-splitting performance.

When the number of laminated layers of dielectric multilayer films was around 120, with respect to light in a wavelength range of 400 nm through 550 nm, the transmittance of a P polarization component was substantially 100% and the transmittance of an S polarization component was substantially 0%, which is an extremely favorable polarization-splitting function. However, the wavelength range in which a favorable polarization-splitting function can be realized is narrow with respect to the visible wavelength region. Therefore, the polarization-splitting function cannot be exhibited for reddish light.

In consideration of the above, in order to realize a favorable polarization-splitting function as described in the embodiment of the polarization beam splitter disclosed in Patent Document 1, it seems that an extremely large number of laminated layers are required in each dielectric multilayer film. It will be time consuming to form the polarization split film if the number of laminated layers in each dielectric multilayer film is large, which makes it difficult to enhance the efficiency in manufacturing polarization beam splitters.

Furthermore, in the polarization beam splitter described in an embodiment in Patent Document 1, high refractive index glass having a refractive index of 1.85 is used. This means that the high refractive index substance used in the dielectric multilayer film will need to have an extremely high refractive index of 2.6 or more. Such high refractive index glass and high refractive index substances are expensive, which will make it difficult to mass-produce polarization beam splitters at low cost and with high efficiency.

Patent Document 1: Japanese Laid-Open Patent Application No. H11-211916

SUMMARY OF THE INVENTION

The present invention provides a polarization beam splitter and a polarization conversion element in which one or more of the above-described disadvantages are eliminated.

A preferred embodiment of the present invention provides a polarization beam splitter and a polarization conversion element including the same, in which a polarization split film can be formed of a relatively small number of laminated layers in each dielectric multilayer film and a favorable polarization-splitting function can be realized across a wide visible wavelength region, specifically in a range of 400 nm through 750 nm.

An embodiment of the present invention provides a polarization beam splitter for polarization-splitting incident light, wherein the polarization beam splitter is effective when light to undergo polarization-splitting has an incidence angle that falls in a range of 54 degrees through 66 degrees, the polarization beam splitter including, between two transparent substrates, an adhesive layer configured to adhere to a first transparent substrate of the two transparent substrates; two or more types of dielectric multilayer films having different design basis wavelengths; and a single-layer dielectric film, wherein each of the two or more types of dielectric multilayer films includes high refractive index films and mid refractive index films each having an optical thickness in accordance with the corresponding design basis wavelength, wherein the high refractive index films and the mid refractive index films are alternately laminated to form an even number of layers; the single-layer dielectric film is provided on a side of the adhesive layer of the dielectric multilayer film provided on the side of the adhesive layer, wherein the single-layer dielectric film is the same as one of the films corresponding to a first layer in said one of the dielectric multilayer films provided on the side of the adhesive layer; and the two or more types of dielectric multilayer films and the single-layer dielectric film form a polarization split film, which performs a polarization split function with respect to light that substantially includes the entire visible wavelength region.

According to one embodiment of the present invention, a polarization beam splitter and a polarization conversion element including the same are provided, in which a polarization split film can be formed of a relatively small number of laminated layers in each dielectric multilayer film and a favorable polarization-splitting function can be realized in a wide visible wavelength region ranging from 400 nm through 750 nm with respect to light with an incidence angle that falls in a range of 54 degrees through 66 degrees.

Each transparent substrate can be made of low-cost and readily available optical glass having a refractive index that falls in a range of 1.46 through 1.58, such as BK7. The high refractive index films in each dielectric multilayer film can be made of a low-cost material that can be realized with a refractive index of around 2.3, such as $Nb_2O_5$. Accordingly, a low-cost polarization beam splitter can be provided.

The polarization beam splitter according to an embodiment of the present invention has an excellent polarization-splitting function, and therefore the polarization conversion elements formed with such polarization beam splitters can realize favorable polarization conversion properties.

BRIEF DESCRIPTION OF THE DRAWINGS

Other objects, features and advantages of the present invention will become more apparent from the following detailed description when read in conjunction with the accompanying drawings, in which:

FIG. 2 is a chart for describing a polarization-splitting function of a polarization beam splitter according to practical example 1 of the present invention;

FIG. 8 is a chart for describing a polarization-splitting function of a polarization beam splitter according to practical example 9 of the present invention;

FIG. 9 is a chart for describing a polarization-splitting function performed when only the first multilayer film of practical example 1 is provided;

FIG. 10 is a chart for describing a polarization-splitting function performed when only the second multilayer film of practical example 1 is provided;

FIG. 11 is a chart for describing a polarization-splitting function performed only when the third multilayer film of practical example 1 is provided;

FIG. 13 is a chart for describing a polarization-splitting function performed when only the second and third multilayer films of practical example 1 are provided;

FIG. 14 is a chart for describing a polarization-splitting function of a polarization beam splitter according to practical example 11 of the present invention;

FIG. 15 is a chart for describing a polarization-splitting function of a polarization beam splitter according to practical example 12 of the present invention;

FIG. 17 is a chart for describing a polarization-splitting function of a polarization beam splitter according to practical example 13 of the present invention;

FIG. 18 is a chart for describing a polarization-splitting function of a polarization beam splitter according to practical example 14 of the present invention;

FIGS. 20A through 20F are charts plotting the maximum values of the transmittance of S polarization for different combinations of numbers of laminated layers included in respective ones of the first multilayer film through the third multilayer film.

DETAILED DESCRIPTION OF THE PREFERRED EMBODIMENTS

A description is given, with reference to the accompanying drawings, of an embodiment of the present invention.

Figure 1:
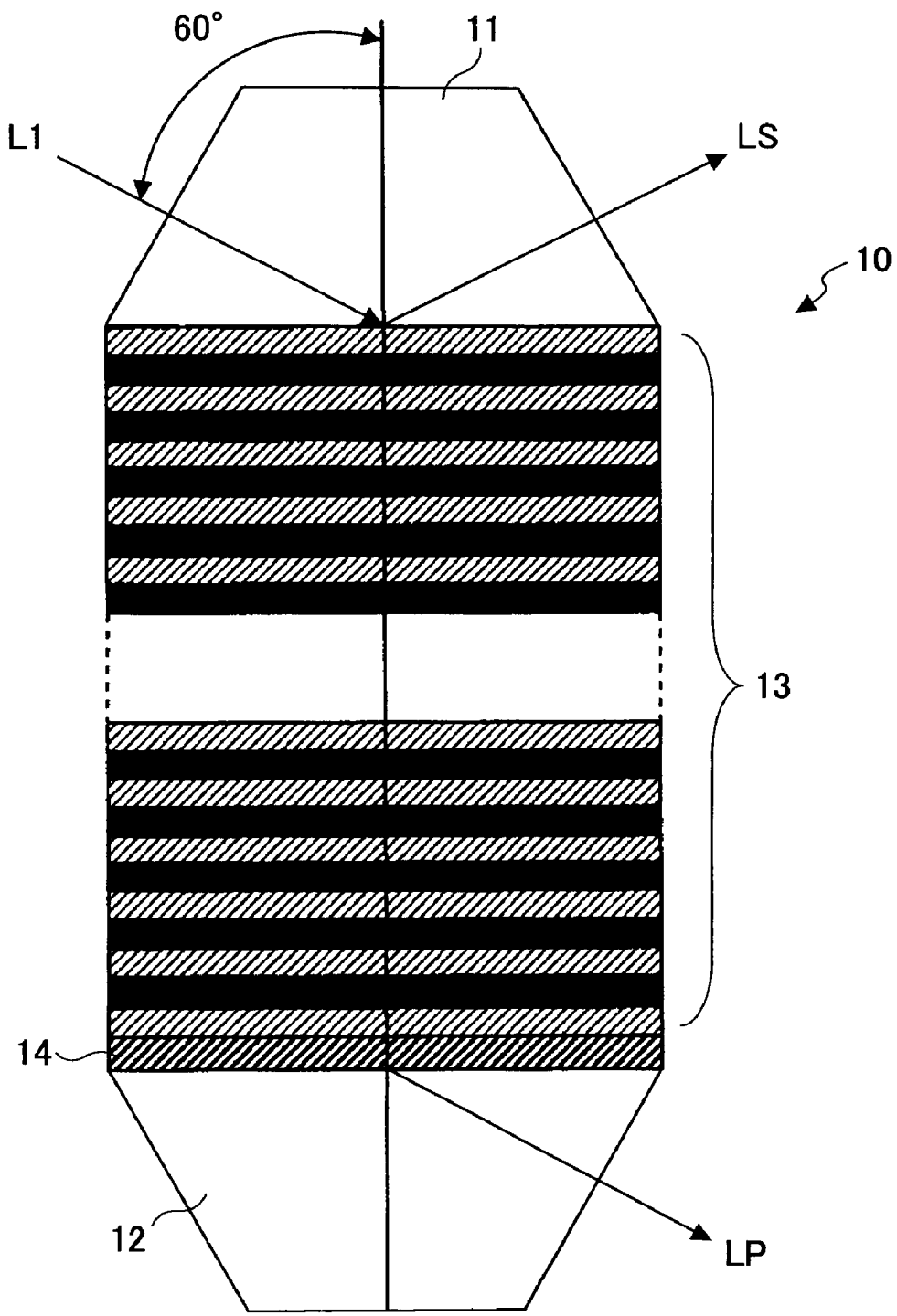
FIG. 1 is a diagram for describing a polarization beam splitter according to an embodiment of the present invention.

FIG. 1 is a diagram for describing a polarization beam splitter 10 according to an embodiment of the present invention.

The polarization beam splitter 10 shown in FIG. 1 polarization-splits incident light. The incidence angle of the light to undergo polarization-splitting is set to be 60 degrees.

The polarization beam splitter 10 includes, in between a pair of transparent substrates 11, 12, an adhesive layer 14 provided for adhering to one of the transparent substrates, and a polarization split film 13.

As shown in FIG. 1, the cross-sectional shape of each transparent substrate 11, 12 is a trapezoid. Each of the base angles of these trapezoids is set to be 60 degrees. Incident light LI to undergo polarization-splitting is applied to the transparent substrate 11 from the left side when viewed in the figure in such a manner as to be orthogonal relative to the incidence surface on the left side. Therefore, the incident light LI is incident on the polarization split film 13 at an incidence angle of 60 degrees.

In the light beam incident on the polarization split film 13, a polarization component within a plane orthogonal to the figure is reflected from the polarization split film 13 and exits the polarization beam splitter 10 as S polarization LS from the right side of the transparent substrate 11 when viewed in the figure, in such a manner as to be orthogonal relative to the exit surface of this right side. Furthermore, a polarization component that is parallel to the figure is transmitted through the polarization split film 13 and the adhesive layer 14 and exits the polarization beam splitter 10 as P polarization LP from the right side of the transparent substrate 12 when viewed in the figure, in such a manner as to be orthogonal relative to the exit surface of this right side. Accordingly, the incident light LI that is applied to the polarization beam splitter 10 shown in FIG. 1 at an incidence angle of 60 degrees is polarization-split into the S polarization LS and the P polarization LP; the S polarization LS and the P polarization LP have an included angle of 60 degrees.

The angle between the S polarization LS and the P polarization LP can be made other than 60 degrees by adjusting the base angle on the right side of the transparent substrate 11, which sets the surface from which the S polarization LS exits the polarization beam splitter 10 and the base angle on the right side of the transparent substrate 12, which sets the surface from which the P polarization LP exits the polarization beam splitter 10.

The polarization split film 13 includes two or more types of dielectric multilayer films corresponding to different design basis wavelengths.

Each of the two or more types of dielectric multilayer films is formed by alternately laminating high refractive index films and mid refractive index films having optical thicknesses in accordance with the corresponding design basis wavelength. The polarization split film 13 has a polarization-splitting function that substantially corresponds to light in the visible wavelength region.

The following are practical examples of the polarization beam splitter 10 shown in FIG. 1.

Practical Example 1

As shown in FIG. 1, the polarization beam splitter according to practical example 1 is designed to have an incidence angle of 60 degrees. Table 1 shows the configuration of the polarization beam splitter according to practical example 1.

TABLE 1

| | LAYER | SUBSTANCE | CENTER WAVE-LENGTH $\lambda 0$ | REFRACTIVE INDEX n | FILM THICKNESS nd | PHYSICAL FILM THICKNESS d(nm) | nd = $\lambda 0/4$ |
|---|---|---|---|---|---|---|---|
| | SUBSTRATE | BSC7 | — | — | — | — | DIFFERENT MID-REFRACTIVE INDEX FILM |
| FIRST MULTILAYER FILM | 1 | Nb2O5/SiO2 | 840.0 | 1.572 | 0.25$\lambda$ | 133.60 | |
| | 2 | Nb2O5 | 610.0 | 2.213 | 0.25$\lambda$ | 68.90 | |
| | 3 | Nb2O5/SiO2 | 610.0 | 1.613 | 0.25$\lambda$ | 94.60 | |
| | 4 | Nb2O5 | 610.0 | 2.213 | 0.25$\lambda$ | 68.90 | |
| | 5 | Nb2O5/SiO2 | 610.0 | 1.613 | 0.25$\lambda$ | 94.60 | |
| | 6 | Nb2O5 | 610.0 | 2.213 | 0.25$\lambda$ | 68.90 | |
| | 7 | Nb2O5/SiO2 | 610.0 | 1.613 | 0.25$\lambda$ | 94.60 | |
| | 8 | Nb2O5 | 610.0 | 2.213 | 0.25$\lambda$ | 68.90 | |
| | 9 | Nb2O5/SiO2 | 610.0 | 1.613 | 0.25$\lambda$ | 94.60 | |
| | 10 | Nb2O5 | 610.0 | 2.213 | 0.25$\lambda$ | 68.90 | |
| | 11 | Nb2O5/SiO2 | 610.0 | 1.613 | 0.25$\lambda$ | 94.60 | |
| | 12 | Nb2O5 | 610.0 | 2.213 | 0.25$\lambda$ | 68.90 | |
| | 13 | Nb2O5/SiO2 | 610.0 | 1.613 | 0.25$\lambda$ | 94.60 | |
| | 14 | Nb2O5 | 610.0 | 2.213 | 0.25$\lambda$ | 68.90 | |
| | 15 | Nb2O5/SiO2 | 610.0 | 1.613 | 0.25$\lambda$ | 94.60 | |
| SECOND MULTILAYER FILM | 16 | Nb2O5 | 830.0 | 2.170 | 0.25$\lambda$ | 95.60 | |
| | 17 | Nb2O5/SiO2 | 830.0 | 1.623 | 0.25$\lambda$ | 127.90 | |
| | 18 | Nb2O5 | 830.0 | 2.170 | 0.25$\lambda$ | 95.60 | |
| | 19 | Nb2O5/SiO2 | 830.0 | 1.623 | 0.25$\lambda$ | 127.90 | |
| | 20 | Nb2O5 | 830.0 | 2.170 | 0.25$\lambda$ | 95.60 | |
| | 21 | Nb2O5/SiO2 | 830.0 | 1.623 | 0.25$\lambda$ | 127.90 | |
| | 22 | Nb2O5 | 830.0 | 2.170 | 0.25$\lambda$ | 95.60 | |
| | 23 | Nb2O5/SiO2 | 830.0 | 1.623 | 0.25$\lambda$ | 127.90 | |
| | 24 | Nb2O5 | 830.0 | 2.170 | 0.25$\lambda$ | 95.60 | |
| | 25 | Nb2O5/SiO2 | 830.0 | 1.623 | 0.25$\lambda$ | 127.90 | |
| | 26 | Nb2O5 | 830.0 | 2.170 | 0.25$\lambda$ | 95.60 | |
| | 27 | Nb2O5/SiO2 | 830.0 | 1.623 | 0.25$\lambda$ | 127.90 | |
| | 28 | Nb2O5 | 830.0 | 2.170 | 0.25$\lambda$ | 95.60 | |
| | 29 | Nb2O5/SiO2 | 830.0 | 1.623 | 0.25$\lambda$ | 127.90 | |
| THIRD MULTILAYER FILM | 30 | Nb2O5 | 940.0 | 2.159 | 0.25$\lambda$ | 108.80 | |
| | 31 | Nb2O5/SiO2 | 940.0 | 1.616 | 0.25$\lambda$ | 145.40 | |
| | 32 | Nb2O5 | 940.0 | 2.159 | 0.25$\lambda$ | 108.80 | |
| | 33 | Nb2O5/SiO2 | 940.0 | 1.616 | 0.25$\lambda$ | 145.40 | |
| | 34 | Nb2O5 | 940.0 | 2.159 | 0.25$\lambda$ | 108.80 | |
| | 35 | Nb2O5/SiO2 | 940.0 | 1.616 | 0.25$\lambda$ | 145.40 | |
| | 36 | Nb2O5 | 940.0 | 2.159 | 0.25$\lambda$ | 108.80 | |
| | 37 | Nb2O5/SiO2 | 940.0 | 1.616 | 0.25$\lambda$ | 145.40 | |
| | 38 | Nb2O5 | 940.0 | 2.159 | 0.25$\lambda$ | 108.80 | |
| | 39 | Nb2O5/SiO2 | 940.0 | 1.616 | 0.25$\lambda$ | 145.40 | |
| | 40 | Nb2O5 | 940.0 | 2.159 | 0.25$\lambda$ | 108.80 | |
| | 41 | Nb2O5/SiO2 | 940.0 | 1.616 | 0.25$\lambda$ | 145.40 | |
| | 42 | Nb2O5 | 940.0 | 2.159 | 0.25$\lambda$ | 108.80 | SAME AS FIRST LAYER OF LAST MULTILAYER FILM |
| | 43 | Nb2O5/SiO2 | 940.0 | 1.616 | 0.25$\lambda$ | 145.40 | |
| | 44 | Nb2O5 | 940.0 | 2.159 | 0.25$\lambda$ | 108.80 | |
| | 45 | Nb2O5/SiO2 | 840.0 | 1.572 | 0.25$\lambda$ | 133.60 | DIFFERENT MID-REFRACTIVE INDEX FILM |
| | 46 | ADHESIVE LAYER | — | — | — | — | |
| | SUBSTRATE | BSC7 | — | — | — | — | |

Terms in Table 1 are described as follows.

"Layer" in the topmost field indicates a pair of transparent substrates and dielectric films.

"Substrate" at the top part of Table 1 corresponds to the transparent substrate 11 shown in FIG. 1.

"Substrate" at the bottom part of Table 1 corresponds to the transparent substrate 12 shown in FIG. 1. The numeric values 1 through 46 in the layer field (hereinafter, "layer number 1 through 46") indicate the order in which the dielectric films and an adhesive layer are deposited. "Substance" indicates materials of the transparent substrates and the dielectric films. "Center wavelength" indicates the design basis wavelength described above. "Refractive index" indicates the refractive index of the transparent substrates and the dielectric films.

"Film thickness" indicates, for each of the dielectric films, the product of the refractive index of a film and the physical thickness of the film itself, which corresponds to the optical thickness described above. "Physical film thickness" indicates the aforementioned thickness of the film itself.

The center wavelength, which is the design basis wavelength, is expressed as "λ0". The refractive index is expressed as "n". The physical film thickness is expressed as "d". Accordingly, the film thickness is expressed as "nd". In practical example 1, the film thickness "nd" of all of the films is set to be λ0/4 (=0.25λ0, expressed as 0.251 in Table 1)

The first multilayer film, the second multilayer film, and the third multilayer film in Table 1 correspond to the above-described dielectric multilayer films. The first through third multilayer films have different center wavelengths λ0, i.e. design basis wavelengths.

In the field of the material of each of the dielectric films, Nb2O5 corresponds to $Nb_2O_5$; Nb2O5/SiO2 corresponds to a mixture of $Nb_2O_5$ and $SiO_2$. The same expression may be used in the following descriptions.

Each of the transparent substrates ("substrate" at the top and bottom in Table 1) is made of a material referred to as BSC7 (a name of a product manufactured by HOYA CORPORATION), which is the most widely used optical glass material, which is typically referred to as BK7 having a refraction index of 1.52.

The dielectric film formed as layer number 1 on the substrate at the top part in Table 1 (transparent substrate 11 in FIG. 1) is made to realize a film thickness of 0.25λ0 with respect to a center wavelength λ0=840 nm. Specifically, the mixture ratio of $Nb_2O_5$ and $SiO_2$ in the mixture of the film Nb2O5/SiO2 is set in such a manner as to realize a refraction index of 1.572. The actual physical film thickness is 133.60 nm, and the optical thickness is 133.60×1.572=210.0=840/4. The dielectric film of layer number 1 corresponds to one of two mid refractive index films between which the dielectric multilayer films are sandwiched (hereinafter, "sandwich-use mid refractive index films").

The first multilayer film (first type of dielectric multilayer film) includes 14 layers corresponding to layer numbers 2 through 15, and has a center wavelength (first type of design basis wavelength) of λ0=610 nm. In the first multilayer film, the films with layer numbers that are even numbers are made of a high refractive index substance $Nb_2O_5$ (refractive index nH1=2.213 at a center wavelength 610 nm). In the first multilayer film, the films with layer numbers that are odd numbers are made of a mid refractive index substance Nb2O5/SiO2 in which the mixture ratio is adjusted in such a manner as to realize a refractive index nL1=1.613 at a center wavelength 610 nm. The high refractive index film and the mid refractive index film are alternately laminated to form 14 layers in the first multilayer film.

The high refractive index film has a physical film thickness (d) of 68.90 and a refractive index (n) of 2.213, and therefore the film thickness (nd) is 68.90×2.213=152.5=610/4. The mid refractive index film has a physical film thickness (d) of 94.60 and a refractive index (n) of 1.613, and therefore the film thickness (nd) is 94.60×1.613=152.5=610/4.

The second multilayer film (second type of dielectric multilayer film) includes 14 layers corresponding to layer numbers 16 through 29, and has a center wavelength (second type of design basis wavelength) of λ0=830 nm. In the second multilayer film, the films with layer numbers that are even numbers are made of a high refractive index substance $Nb_2O_5$ (refractive index nH2=2.170 at a center wavelength 830 nm). In the second multilayer film, the films with layer numbers that are odd numbers are made of a mid refractive index substance Nb2O5/SiO2 in which the mixture ratio is adjusted in such a manner as to realize a refractive index nL2=1.623 at a center wavelength 830 nm). The high refractive index film and the mid refractive index film are alternately laminated to form 14 layers in the second multilayer film.

The high refractive index film has a physical film thickness (d) of 95.60 nm and a refractive index (n) of 2.170, and therefore the film thickness (nd) is 95.60×2.170=207.5=830/4. The mid refractive index film has a physical film thickness (d) of 127.9 nm and a refractive index (n) of 1.623, and therefore the film thickness (nd) is 127.9×1.623=207.5=830/4.

The third multilayer film (third type of dielectric multilayer film) includes 14 layers corresponding to layer numbers 30 through 43, and has a center wavelength (third type of design basis wavelength) of λ0=940 nm. In the third multilayer film, the films with layer numbers that are even numbers are made of a high refractive index substance $Nb_2O_5$ (refractive index nH3=2.159 at a center wavelength 940 nm). In the third multilayer film, the films with layer numbers that are odd numbers are made of a mid refractive index substance Nb2O5/SiO2 in which the mixture ratio is adjusted in such a manner as to realize a refractive index nL3=1.616 at a center wavelength 940 nm. The high refractive index film and the mid refractive index film are alternately laminated to form 14 layers in the third multilayer film.

The high refractive index film has a physical film thickness (d) of 108.8 nm and a refractive index (n) of 2.159, and therefore the film thickness (nd) is 108.8×2.159=235=940/4. The mid refractive index film has a physical film thickness (d) of 145.4 nm and a refractive index (n) of 1.616, and therefore the film thickness (nd) is 145.4×1.616=235=940/4.

Among the first through third multilayer films, the third multilayer film is on the side of an adhesive layer (layer number 46). A dielectric film (layer number 44) deposited on the third multilayer film is a single-layer dielectric film that is the same as (has the same composition and thickness as) the first layer in the third multilayer film (i.e., a dielectric film of layer number 30; specifically, the film is made of a high refractive index substance $Nb_2O_5$ (refractive index is nH3=2.159 at a center wavelength of 940 nm).

A dielectric film (layer number 45) is formed on the single-layer dielectric film (layer number 44). The dielectric film (layer number 45) is made to realize a film thickness of 0.25λ0 at a center wavelength λ0=840 nm. Specifically, the mixture ratio of $Nb_2O_5$ and $SiO_2$ in the mixture of the film Nb2O5/SiO2 is set in such a manner as to realize a refraction index of 1.572. The actual physical film thickness is 133.60 nm, and the optical thickness is 133.60×1.572=210.0=840/4. The dielectric film of layer number 45 is the same as the dielectric film of layer number 1, and configures the pair of sandwich-use mid refractive index films together with the dielectric film of layer number 1.

The dielectric film of layer number 45 is adhered to the other substrate (corresponding to the transparent substrate 12 shown in FIG. 1) by an adhesive layer (layer number 46) made of an adhesive. The adhesive configuring the adhesive layer can be a commercially available epoxy adhesive.

As described above, a polarization split film can be formed merely with the first through third multilayer films (layer number 2 through 43) and the single-layer film (layer number 44). In practical example 1, these films and the sandwich-use mid refractive index films (layer numbers 1 and 45) form the polarization split film.

As shown in FIG. 1, the cross-sectional shape of each of the two transparent substrates, between which the first through third multilayer films are sandwiched, is a trapezoid. Each of the base angles of these trapezoids is set to be 60 degrees. The incident light LI is applied to the transparent substrate 11 from a side of the transparent substrate, in such a manner as to be incident on the polarization split film at an incidence angle of 60 degrees.

The polarization beam splitter according to practical example 1 has the above configuration.

As described above, the polarization beam splitter according to an embodiment of the present invention is capable of realizing a favorable polarization-splitting function in a wide visible wavelength region ranging from 400 nm through 750 nm. As described below, with the polarization beam splitter of practical example 1, an extremely favorable polarization-splitting function is realized. Specifically, with respect to incident light with an incidence angle of 60 degrees, in a wide wavelength region ranging between 380 nm and 780 nm that exceeds the visible wavelength region, the transmittance of P polarization LP is 95% or more and the transmittance of S polarization LS is substantially 0%.

A brief description is given of the functions of the first through third multilayer films in the polarization beam splitter according to practical example 1.

The incident light LI is applied to the first multilayer film at an incidence angle of 60 degrees. Therefore, the propagation direction of the light transmitting through the first multilayer film is tilted relative to the thickness direction of each dielectric film in the first multilayer film, so that the actual distance of being transmitted through the dielectric film is much longer than the actual physical film thickness. The actual distance of being transmitted through the dielectric film is referred to as an "optically effective film thickness". The optically effective film thickness is obtained as follows; a distance of being transmitted through the dielectric film when the light is obliquely applied to the film is converted into a case where the light is orthogonally applied to the film.

In the first multilayer film, the optically effective film thickness with respect to the high refractive index film is 494/4 nm, and the optically effective film thickness with respect to the mid refractive index film is 360/4 nm. The first multilayer film takes charge of polarization-splitting at a wavelength region centering around 427 nm, which is an average value of the two aforementioned thicknesses.

Similarly, in the second multilayer film, the optically effective film thickness with respect to the high refractive index film is 672/4 nm, and the optically effective film thickness with respect to the mid refractive index film is 490/4 nm. The second multilayer film takes charge of polarization-splitting at a wavelength region centering around 581 nm, which is an average value of the two aforementioned thicknesses.

In the third multilayer film, the optically effective film thickness with respect to the high refractive index film is 761/4 nm, and the optically effective film thickness with respect to the mid refractive index film is 555/4 nm. The third multilayer film takes charge of polarization-splitting at a wavelength region centering around 658 nm, which is an average value of the two aforementioned thicknesses.

In this manner, polarization-splitting is performed at a wavelength region centering around 427 nm by the first multilayer film, at a wavelength region centering around 581 nm by the second multilayer film, and at a wavelength region centering around 658 nm by the third multilayer film. Overall, a favorable polarization-splitting function can be attained in a wavelength region ranging between 380 nm and 780 nm.

FIG. 2 illustrates the polarization-splitting function when a light beam to undergo polarization-splitting is applied to the polarization beam splitter of practical example 1 at an incidence angle of 60 degrees. The vertical axis indicates the transmittance in units of % and the horizontal axis indicates the wavelength in units of nm.

In FIG. 2, the curve denoted by a reference numeral 2-1 indicates the transmittance of P polarization, which is 95% or more in a wavelength range of 380 nm through 800 nm, which exceeds the visible wavelength region. The curve denoted by a reference numeral 2-2 indicates the transmittance of S polarization, which is ideally 0%, but is substantially 0% in a wavelength range of 380 nm through 780 nm.

As is clear from the above, the polarization beam splitter according to practical example 1 exhibits an extremely favorable polarization-splitting function with respect to a light beam incident at an incidence angle of 60 degrees that is a design value, in a wavelength range of 380 nm through 780 nm, which exceeds the visible wavelength region. The polarization split film includes a total of 45 layers, which is a small number of films; specifically, 43 layers (layer numbers 2 through 44) in the first to third multilayer films and the single-layer dielectric film, and two layers of mid refractive index films (layer numbers 1 and 45) between which the 43 layers are sandwiched. The transparent substrates are made of BK7, which is inexpensive and has a low refractive index. The refractive index of the high refractive index film in the multilayer film is around 2.2.

That is, the polarization beam splitter according to practical example 1 uses an inexpensive material for the transparent substrate, and has a small number of layers (45 layers). Therefore, time and cost required for deposition can be reduced. Accordingly, the polarization beam splitter can be manufactured at low cost, and can exhibit a favorable polarization-splitting function in a wide visible wavelength region.

Figure 3A:
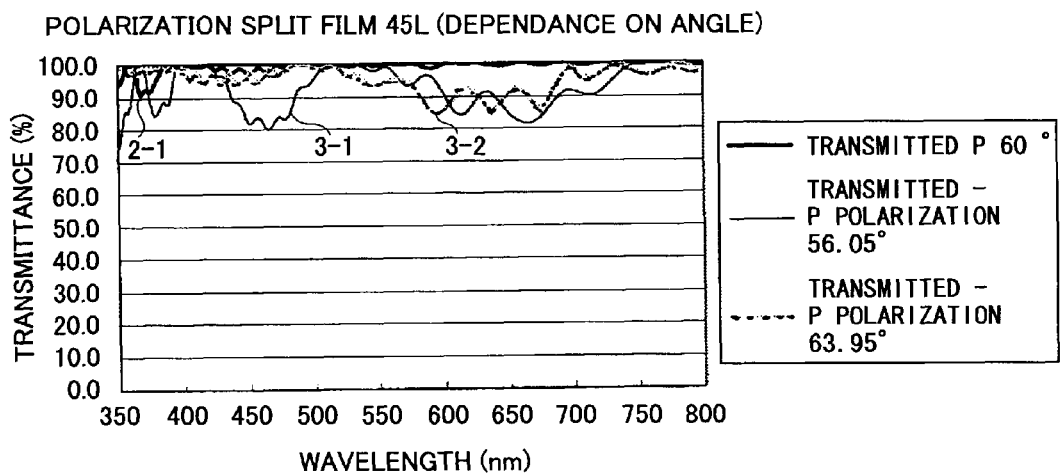
FIGS. 3A, 3B are charts for describing how a polarization-splitting function according to practical example 1 of the present invention is dependent on an incidence angle.
Figure 3B:
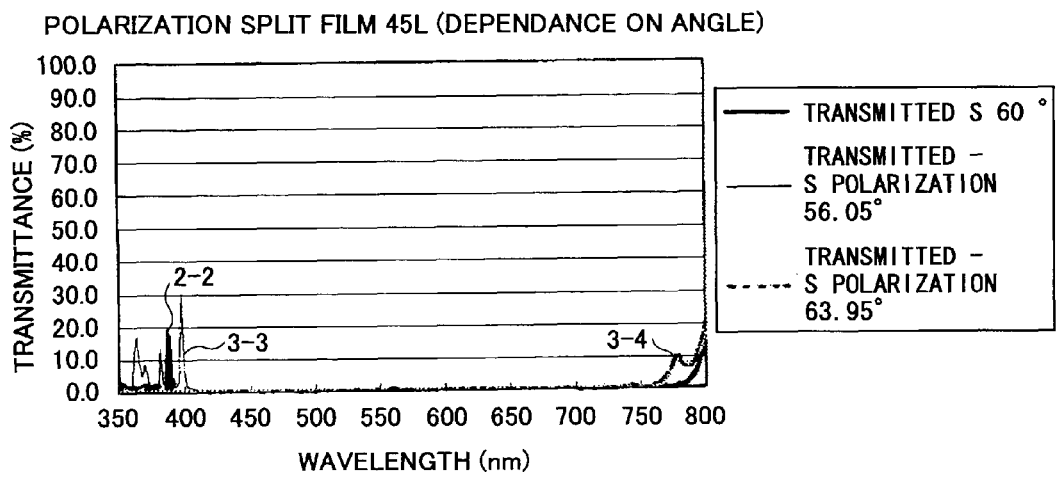

FIGS. 3A and 3B illustrate the transmittance of P polarization and S polarization in a case where the design incidence angle deviates by ±6 degrees from 60 degrees when a light beam to undergo polarization-splitting is applied to the polarization beam splitter according to practical example 1 of the present invention.

In practical example 1, the cross-sectional shape of the transparent substrates is a trapezoid, and each of the base angles of this trapezoid is 60 degrees. A light beam is applied to the transparent substrate at the design incidence angle of 60 degrees, in such a manner as to be orthogonal relative to the oblique surface of the trapezoidal shape. Therefore, the light beam is applied to the incidence surface at a refraction angle of zero, and the light beam directly extends to the polarization split film at an incidence angle of 60 degrees.

When the incidence angle deviates by ±6 degrees from 60 degrees, the incidence angle deviates by ±6 degrees from a direction orthogonal to the oblique surface of the trapezoidal shape. As a result, refraction occurs with respect to the transparent substrate at the incidence surface. Hence, the extent of deviation of the incidence angle at the polarization split film is not ±6 degrees from 60 degrees; the incidence angle at the polarization split film deviates by ±3.95, taking into consideration the refraction index (=1.52) of the transparent substrate (BK7).

In FIGS. 3A and 3B, the curves 2-1 and 2-2 indicate transmittance of P polarization (FIG. 3A) and transmittance of S polarization (FIG. 3B), respectively, at an incidence angle of 60 degrees. These are the same as the curves 2-1 and 2-2 shown in FIG. 2. In FIG. 3A, the curves 3-1 and 3-2 indicate transmittance of P polarization when the incidence angle at the polarization split film is 56.05 degrees and 63.95 degrees, respectively. The transmittance is 80% or more in a wavelength range between 350 nm through 800 nm. In FIG. 3B, the curves 3-3 and 3-4 indicate transmittance of S polarization when the incidence angle at the polarization split film is 56.05 degrees and 63.95 degrees, respectively. The transmittance is substantially 0% in a wavelength range between 400 nm through 775 nm.

As is clear from the above, the polarization-splitting effect is slightly degraded when the incidence angle deviates by ±6 degrees from 60 degrees, compared to that when the incidence angle is 60 degrees. However, from a practical viewpoint, the polarization-splitting effect is sufficient for practical use.

When the polarization beam splitter of practical example 1 is applied to a liquid crystal projector, after a light beam emitted from a light source becomes a collimated light beam, a slight degree of direction dispersion is observed; typically, the direction of the light is dispersed within a range of ±4 degrees. The polarization beam splitter of practical example 1 can tolerate such dispersion, because it has a polarization-splitting function that is sufficient for practical use even when the incidence angle changes by around ±6 degrees, as described above.

In practical example 1, the pair of transparent substrates, between which the polarization split film is sandwiched, is made of BK7. However, the material of the transparent substrates is not limited to BK7; the material can be optical glass having a refractive index that falls in a range of 1.46 through 1.58. In a modification of practical example 1, the first through third multilayer films, the sandwich-use mid refractive index films, and the adhesive layer have the same refractive index, while the transparent substrates are made of optical glass having a different refractive index.

<Modification 1>

In modification 1, the transparent substrates have a refraction index of 1.48 (similar to that of practical example 1, the cross-sectional shape of the transparent substrates is a trapezoid having base angles of 60 degrees, and the incidence angle is set to be 60 degrees).

Figure 4A:
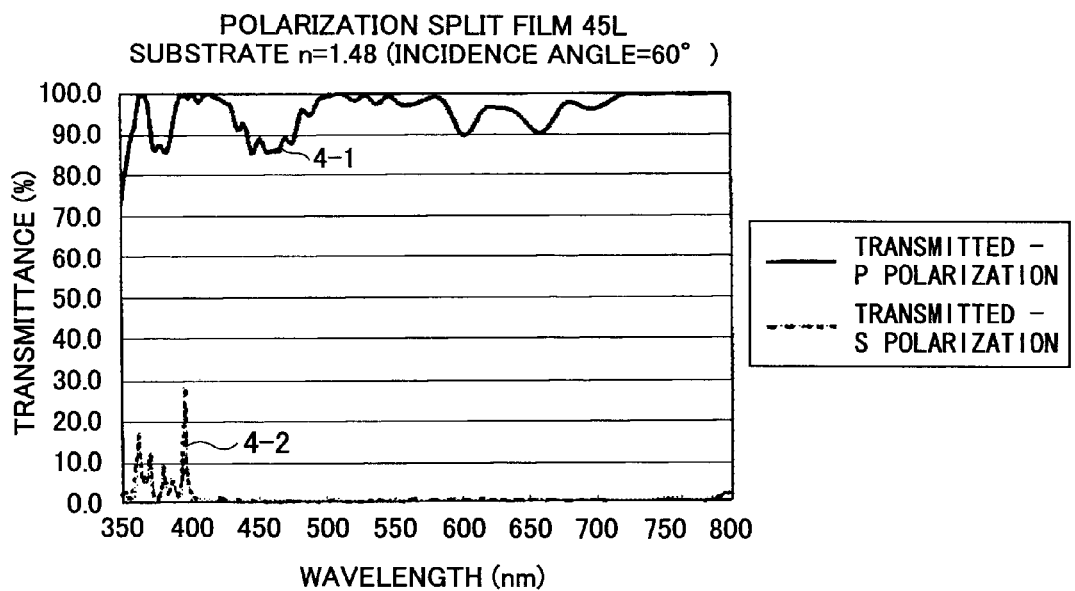
FIGS. 4A, 4B are charts for describing polarization-splitting functions of polarization beam splitters according to practical examples 1 and 2 of the present invention.

FIG. 4A illustrates the transmittance of P polarization (curve 4-1) and the transmittance of S polarization (curve 4-2) of modification 1. The transmittance of P polarization is 80% or more in a wavelength range of 360 nm through 800 nm and the transmittance of S polarization is substantially 0% in a wavelength range of 400 nm through 800 nm, which is a favorable polarization-splitting function.

<Modification 2>

In modification 2, the transparent substrates have a refraction index of 1.58 (similar to that of practical example 1, the cross-sectional shape of the transparent substrate is a trapezoid having base angles of 60 degrees, and the incidence angle is set to be 60 degrees).

Figure 4B:
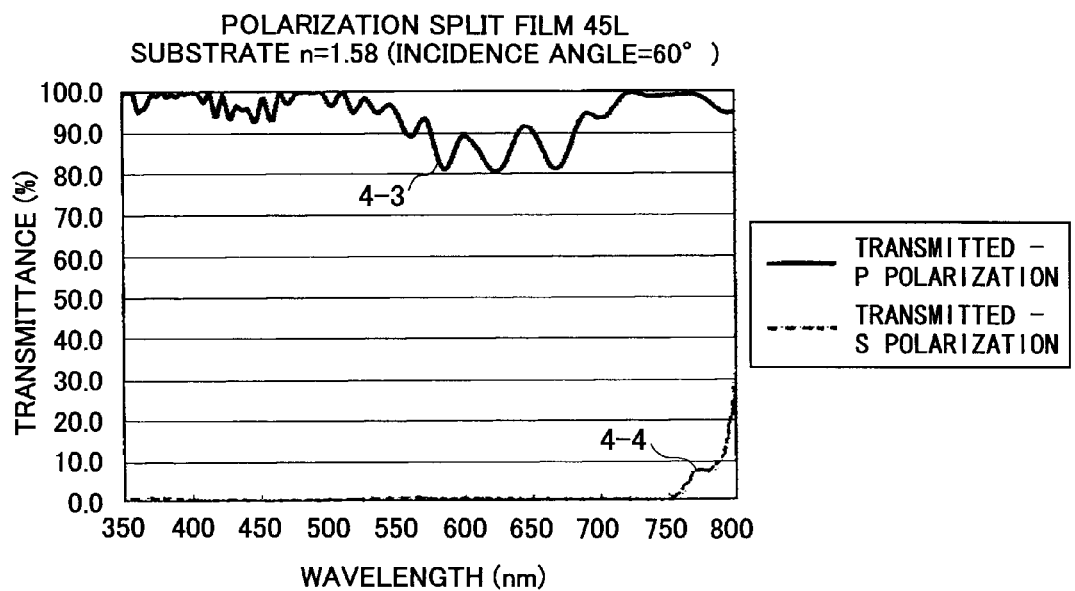

FIG. 4B illustrates the transmittance of P polarization (curve 4-3) and the transmittance of S polarization (curve 4-4) of modification 2. The transmittance of P polarization is 80% or more in a wavelength range of 350 nm through 800 nm and the transmittance of S polarization is substantially 0% in a wavelength range of 350 nm through 750 nm, which is a favorable polarization-splitting function.

Next, in other modifications of practical example 1, the refractive index of the mid refractive index films in the first through third multilayer films is changed.

<Modification 3>

In modification 3, the mid refractive index films (a film made of a mixture of $Nb_2O_5$ and $SiO_2$) have a refraction index of 1.58.

Figure 5A:
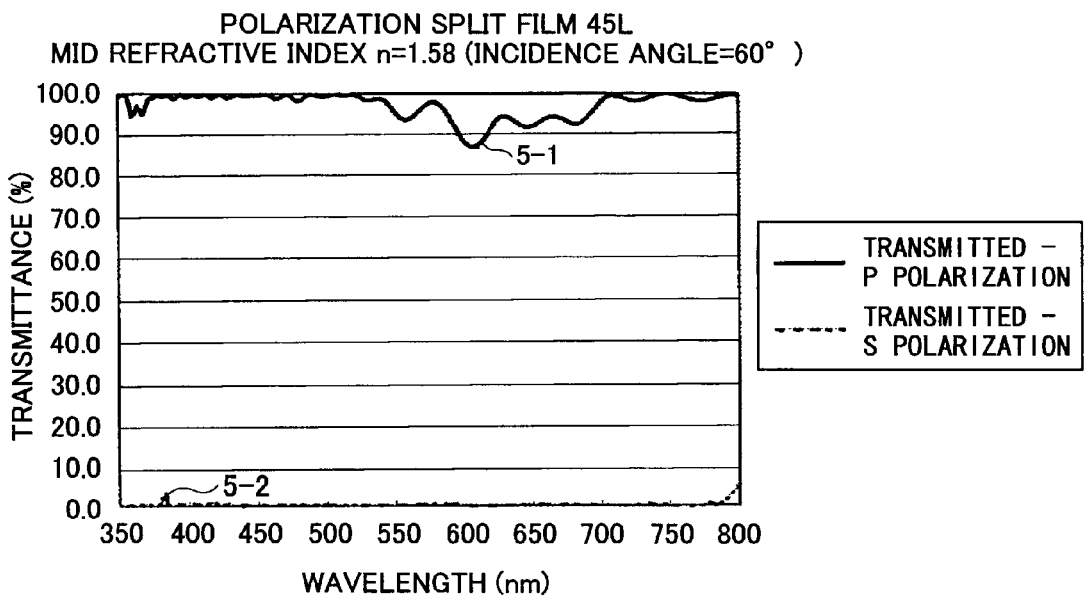
FIGS. 5A, 5B are charts for describing polarization-splitting functions of polarization beam splitters according to practical examples 3 and 4 of the present invention.

FIG. 5A illustrates the transmittance of P polarization (curve 5-1) and the transmittance of S polarization (curve 5-2) of modification 3. The transmittance of P polarization is 85% or more in a wavelength range of 350 nm through 800 nm and the transmittance of S polarization is substantially 0% in a wavelength range of 380 nm through 780 nm, which is a favorable polarization-splitting function.

<Modification 4>

In modification 4, the mid refractive index films (a film made of a mixture of $Nb_2O_5$ and $SiO_2$) have a refraction index of 1.72.

Figure 5B:
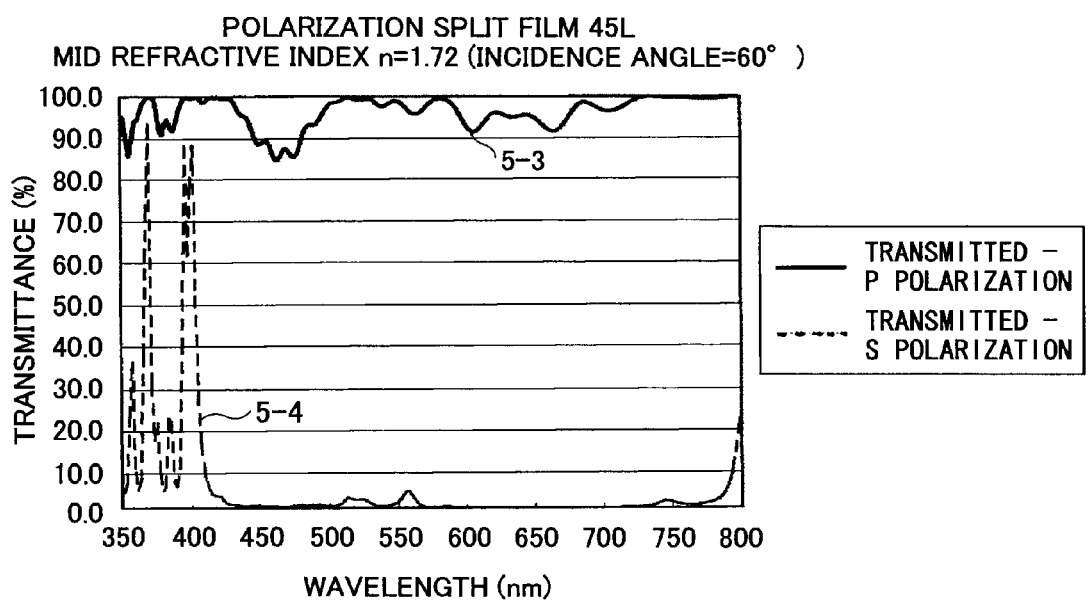

FIG. 5B illustrates the transmittance of P polarization (curve 5-3) and the transmittance of S polarization (curve 5-4) of modification 4. The transmittance of P polarization is 84% or more in a wavelength range of 350 nm through 800 nm and the transmittance of S polarization is 5% or less in a wavelength range of 420 nm through 780 nm, which is a sufficient polarization-splitting function for practical use.

Each refraction index of 1.58 for the mid refractive index films in modification 3 and the refraction index of 1.72 for the mid refractive index films in modification 4 is a central value at the wavelength of 550 nm. The values at actual center wavelengths of 610 nm, 830 nm, and 940 nm are 1.572, 1.553, and 1.546 in modification 3, and 1.711, 1.693, and 1.688 in modification 4, respectively.

Next, in other modifications of practical example 1, the refractive index of the high refractive index films in the first through third multilayer films is changed.

<Modification 5>

In modification 5, the high refractive index film (a film made of $Nb_2O_5$) has a refraction index of 2.086.

Figure 6A:
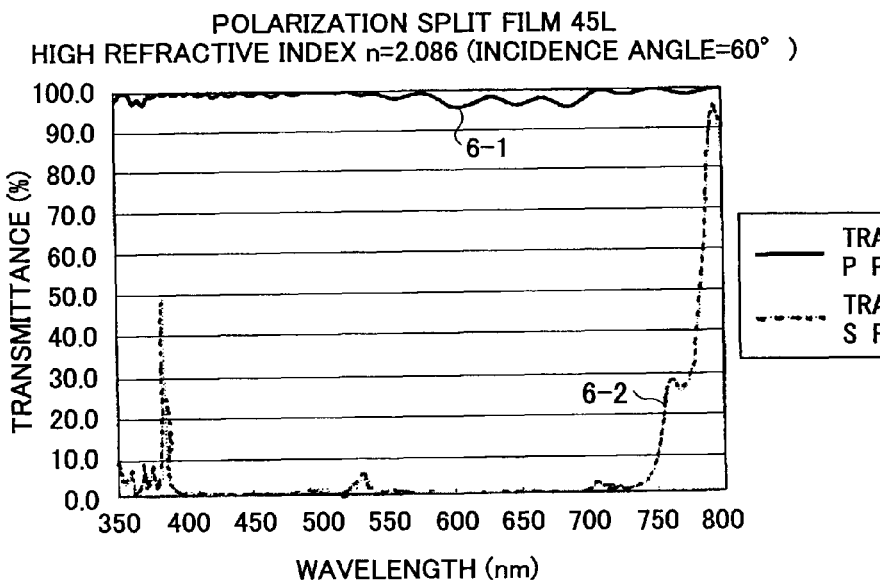
FIGS. 6A, 6B are charts for describing polarization-splitting functions of polarization beam splitters according to practical examples 5 and 6 of the present invention.

FIG. 6A illustrates the transmittance of P polarization (curve 6-1) and the transmittance of S polarization (curve 6-2) of modification 5. The transmittance of P polarization is 95% or more in a wavelength range of 350 nm through 800 nm and the transmittance of S polarization is 5% or less in a wavelength range of 400 nm through 750 nm, which is a sufficient polarization-splitting function for practical use.

<Modification 6>

In modification 6, the high refractive index film (a film made of $Nb_2O_5$) has a refraction index of 2.336.

Figure 6B:
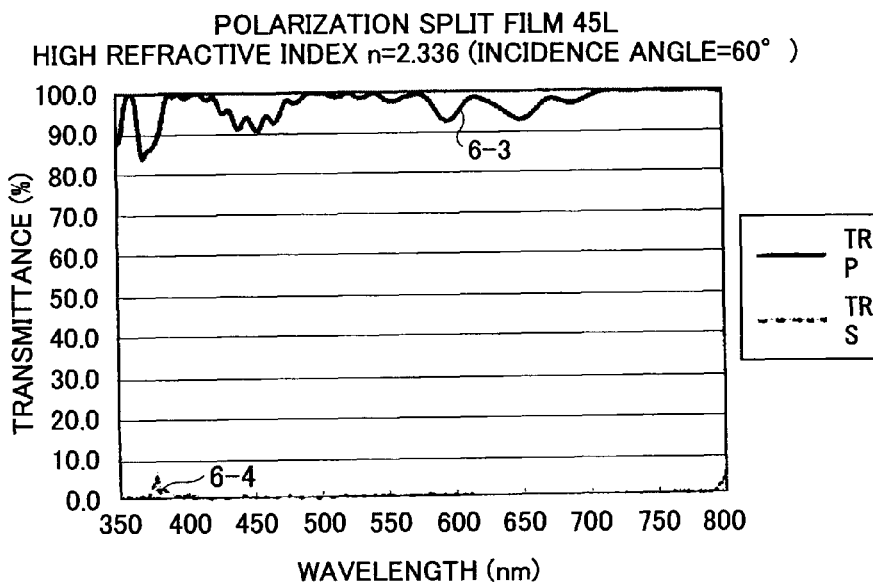

FIG. 6B illustrates the transmittance of P polarization (curve 6-3) and the transmittance of S polarization (curve 6-4) of modification 6. The transmittance of P polarization is 90% or more in a wavelength range of 400 nm through 800 nm and the transmittance of S polarization is substantially 0% in a wavelength range of 400 nm through 800 nm, which is a sufficient polarization-splitting function for practical use.

Each refraction index of 2.086 for the high refractive index films in modification 5 and the refraction index of 2.236 for the high refractive index films in modification 6 is a central value at the wavelength of 550 nm. The values at actual center wavelengths of 610 nm, 830 nm, and 940 nm are 2.063, 2.020, and 2.009 in modification 5, and 2.313, 2.271, and 2.259 in modification 6, respectively.

Next, in other modifications of practical example 1, the configurations of the first through third multilayer films are the same as those of practical example 1, and the refractive index of the sandwich-use mid refractive index films (layer numbers 1 and 45) is changed.

<Modification 7>

In modification 7, the sandwich-use mid refractive index films (a film made of a mixture of $Nb_2O_5$ and $SiO_2$) has a refraction index of 1.555.

Figure 7A:
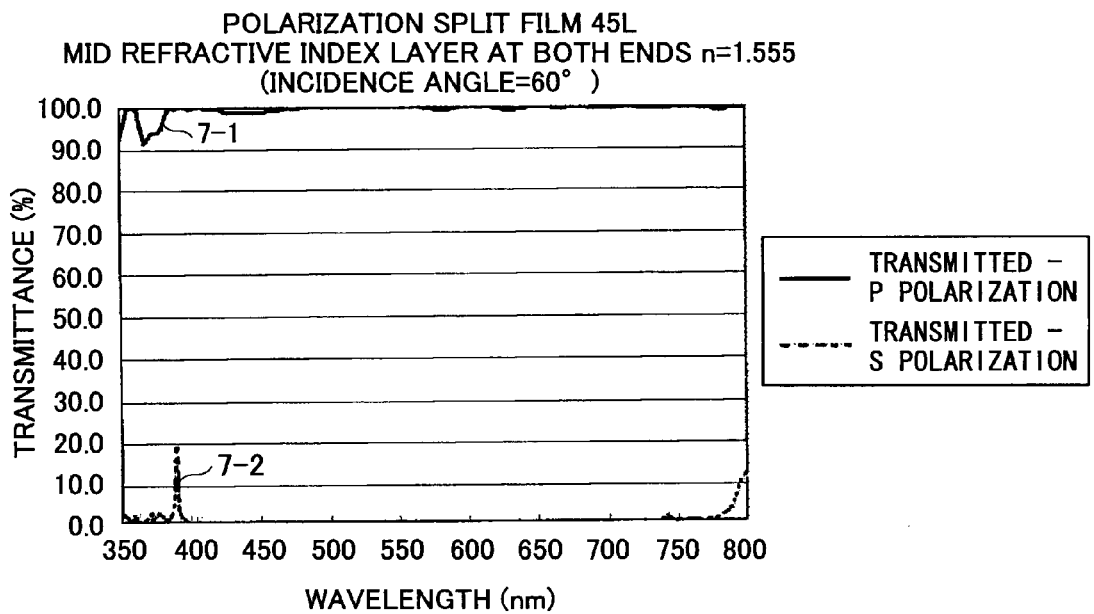
FIGS. 7A, 7B are charts for describing polarization-splitting functions of polarization beam splitters according to practical examples 7 and 8 of the present invention.

FIG. 7A illustrates the transmittance of P polarization (curve 7-1) and the transmittance of S polarization (curve 7-2) of modification 7. The transmittance of P polarization is substantially 100% in a wavelength range of 400 nm through 800 nm and the transmittance of S polarization is substantially 0% in a wavelength range of 400 nm through 780 nm, which is a sufficient polarization-splitting function.

<Modification 8>

In modification 8, the sandwich-use mid refractive index films (a film made of a mixture of $Nb_2O_5$ and $SiO_2$) has a refraction index of 1.65.

Figure 7B:
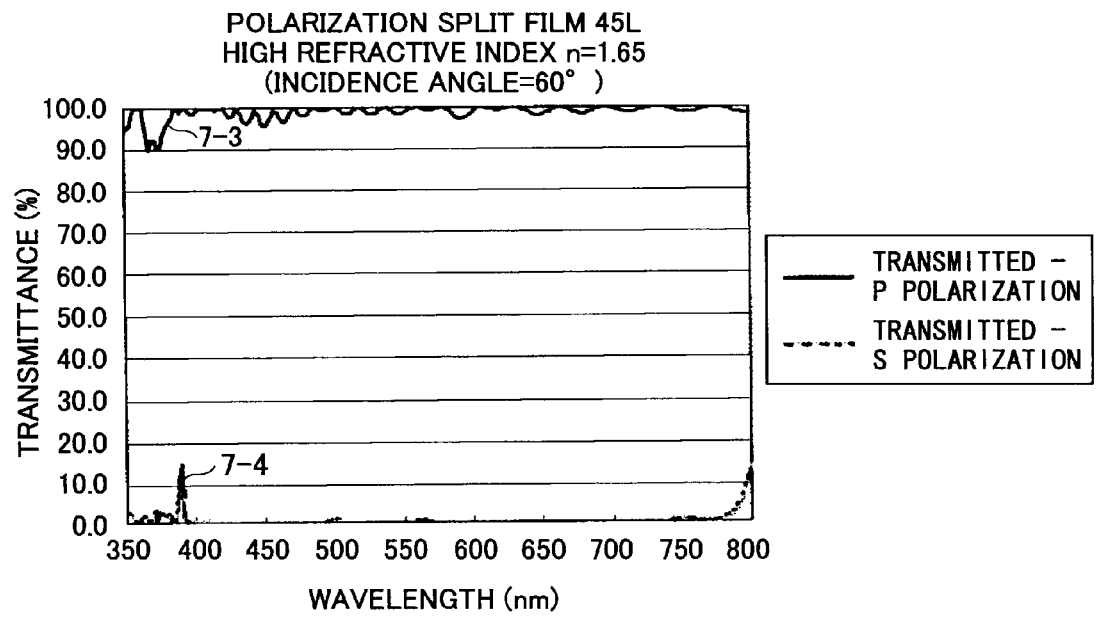

FIG. 7B illustrates the transmittance of P polarization (curve 7-3) and the transmittance of S polarization (curve 7-4) of modification 8. The transmittance of P polarization is 95% or more in a wavelength range of 400 nm through 800 nm and the transmittance of S polarization is substantially 0% in a wavelength range of 390 nm through 780 nm, which is a sufficient polarization-splitting function.

Each refraction index of 1.555 for the sandwich-use mid refractive index films in modification 7 and the refraction index of 1.65 for the sandwich-use mid refractive index film in modification 8 is a central value at the wavelength of 550 nm. The values at actual center wavelengths of 610 nm, 830 nm, and 940 nm are 1.547, 1.527, and 1.521 in modification 7, and 1.641, 1.623, and 1.616 in modification 8, respectively.

As is clear from practical example 1 and modifications 2 through 8, favorable polarization-splitting properties are attained with the transparent substrates having a refraction index that falls in a range of 1.48 through 1.58, and preferable effects can be attained with the use of optical glass having a refraction index that falls in a range of 1.46 through 1.58. For example, in an image displaying apparatus, if the transparent substrate has a refraction index that falls in a range of 1.46 through 1.58, in a wavelength range of 400 nm through 750 nm, the transmittance of P polarization will be substantially 80% or more, and the transmittance of S polarization will be substantially 0%, and therefore the polarization beam splitter is applicable. In the first to third multilayer films, the mid refraction factor films have favorable polarization splitting properties with refractive indices in a range of 1.58 through 1.72 (value at wavelength 555 nm), the high refraction factor films have favorable polarization splitting properties with refractive indices in a range of 2.086 through 2.336, and the sandwich-use mid refraction factor films have favorable polarization splitting properties with refractive indices in a range of 1.565 through 1.65.

Next, a description is given of the technical significance of the sandwich-use mid refractive index films.

<Modification 9>

The sandwich-use mid refractive index films (layer numbers 1 and 45) included in practical example 1, between which the multilayer films are sandwiched, are not included in a polarization beam splitter of modification 9.

FIG. 8 illustrates the transmittance of P polarization (curve 8-1) and the transmittance of S polarization (curve 8-2) of modification 9. The transmittance of P polarization is 95% or more in a wavelength range of 380 nm through 800 nm and the transmittance of S polarization is substantially 0% in a wavelength range of 400 nm through 780 nm, which is a sufficient polarization-splitting function. However, comparing the polarization splitting property chart of FIG. 8 with that of FIG. 2 (of practical example 1), the following difference can be found. The transmittance of P polarization is 97% or more in the wavelength range of 380 nm through 800 nm in practical example 1 (FIG. 2). In modification 9, the transmittance of P polarization is finely vibrating in the range surrounded by a square frame in FIG. 8, i.e., in the wavelength range of 400 nm through 800 nm.

These fine vibrations in the transmittance of P polarization are referred to as ripples. However, by providing sandwich-use mid refractive index films between which the multilayer films are sandwiched, the ripples in the transmittance of P polarization are mitigated. Although a sufficient polarization splitting function for practical use can be attained without the sandwich-use mid refractive index films between which the polarization split film is sandwiched, the spectral transmittance can be further improved by providing the sandwich-use mid refractive index films between which the polarization split film is sandwiched.

As described above, in practical example 1, the first multilayer film takes charge of polarization-splitting at a wavelength region centering around 427 nm, the second multilayer film takes charge of polarization-splitting at a wavelength region centering around 581 nm, and the third multilayer film takes charge of polarization-splitting at a wavelength region centering around 658 nm.

The following describes the polarization splitting properties in a case where one more of the first through third multilayer films is employed.

First, a description is given of a case where only the first multilayer film of practical example 1 is employed.

On the substrate of practical example 1 (substrate at the top part of Table 1) is provided a sandwich-use mid refractive index film, corresponding to layer number 1 (center wavelength λ0=840 nm, substance: Nb2O5/SiO2, refractive index 1.572, physical film thickness: 133.60 nm). On top of this is provided the first multilayer film including 14 layers corresponding to layer numbers 2 through 15 of practical example 1. On top of this is provided a dielectric film as the single-layer dielectric film having the same configuration and thickness as the dielectric film corresponding to layer number 2 (center wavelength 610 nm, substance: $Nb_2O_5$, refractive index 2.213, physical film thickness: 68.90 nm), thereby forming 16 layers. On top of this is provided a sandwich-use mid refractive index film, which is the same as that of layer number 1, thereby forming a polarization split film with a total of 17 layers. The sandwich-use mid refractive index film deposited last is adhered to the other substrate (substrate at bottom of Table 1) with the adhesive layer.

Table 2 shows this configuration, in accordance with Table 1.

TABLE 2

| | LAYER | SUBSTANCE | CENTER WAVELENGTH λ0 | REFRACTIVE INDEX n | FILM THICKNESS nd | PHYSICAL FILM THICKNESS d(nm) |
|---|---|---|---|---|---|---|
| | SUBSTRATE | BSC7 | — | — | — | — |
| | 1 | Nb2O5/SiO2 | 840.0 | 1.572 | 0.25λ | 133.60 |
| FIRST | 2 | Nb2O5 | 610.0 | 2.213 | 0.25λ | 68.90 |
| MULTILAYER | 3 | Nb2O5/SiO2 | 610.0 | 1.613 | 0.25λ | 94.60 |
| FILM | 4 | Nb2O5 | 610.0 | 2.213 | 0.25λ | 68.90 |
| | 5 | Nb2O5/SiO2 | 610.0 | 1.613 | 0.25λ | 94.60 |
| | 6 | Nb2O5 | 610.0 | 2.213 | 0.25λ | 68.90 |
| | 7 | Nb2O5/SiO2 | 610.0 | 1.613 | 0.25λ | 94.60 |

TABLE 2-continued

| LAYER | SUBSTANCE | CENTER WAVELENGTH $\lambda 0$ | REFRACTIVE INDEX n | FILM THICKNESS nd | PHYSICAL FILM THICKNESS d(nm) |
|---|---|---|---|---|---|
| 8 | Nb2O5 | 610.0 | 2.213 | 0.25λ | 68.90 |
| 9 | Nb2O5/SiO2 | 610.0 | 1.613 | 0.25λ | 94.60 |
| 10 | Nb2O5 | 610.0 | 2.213 | 0.25λ | 68.90 |
| 11 | Nb2O5/SiO2 | 610.0 | 1.613 | 0.25λ | 94.60 |
| 12 | Nb2O5 | 610.0 | 2.213 | 0.25λ | 68.90 |
| 13 | Nb2O5/SiO2 | 610.0 | 1.613 | 0.25λ | 94.60 |
| 14 | Nb2O5 | 610.0 | 2.213 | 0.25λ | 68.90 |
| 15 | Nb2O5/SiO2 | 610.0 | 1.613 | 0.25λ | 94.60 |
| 16 | Nb2O5 | 610.0 | 2.213 | 0.25λ | 68.90 |
| 17 | Nb2O5/SiO2 | 840.0 | 1.572 | 0.25λ | 133.60 |
| 18 | ADHESIVE LAYER | — | — | — | — |
| SUBSTRATE | BSC7 | — | — | — | — |

FIG. 9 illustrates the transmittance of P polarization (curve 9-1) and the transmittance of S polarization (curve 9-2) in the aforementioned case. A favorable polarization-splitting function is attained at a wavelength region centering around 427 nm.

total of 17 layers. The sandwich-use mid refractive index film deposited last is adhered to the other substrate (substrate at bottom of Table 1) with the adhesive layer.

Table 3 shows this configuration in accordance with Table 1.

TABLE 3

| | LAYER | SUBSTANCE | CENTER WAVELENGTH $\lambda 0$ | REFRACTIVE INDEX n | FILM THICKNESS nd | PHYSICAL FILM THICKNESS d(nm) |
|---|---|---|---|---|---|---|
| | SUBSTRATE | BSC7 | — | — | — | — |
| | 1 | Nb2O5/SiO2 | 840.0 | 1.572 | 0.25λ | 133.60 |
| SECOND | 2 | Nb2O5 | 830.0 | 2.170 | 0.25λ | 95.60 |
| MULTILAYER | 3 | Nb2O5/SiO2 | 830.0 | 1.623 | 0.25λ | 127.90 |
| FILM | 4 | Nb2O5 | 830.0 | 2.170 | 0.25λ | 95.60 |
| | 5 | Nb2O5/SiO2 | 830.0 | 1.623 | 0.25λ | 127.90 |
| | 6 | Nb2O5 | 830.0 | 2.170 | 0.25λ | 95.60 |
| | 7 | Nb2O5/SiO2 | 830.0 | 1.623 | 0.25λ | 127.90 |
| | 8 | Nb2O5 | 830.0 | 2.170 | 0.25λ | 95.60 |
| | 9 | Nb2O5/SiO2 | 830.0 | 1.623 | 0.25λ | 127.90 |
| | 10 | Nb2O5 | 830.0 | 2.170 | 0.25λ | 95.60 |
| | 11 | Nb2O5/SiO2 | 830.0 | 1.623 | 0.25λ | 127.90 |
| | 12 | Nb2O5 | 830.0 | 2.170 | 0.25λ | 95.60 |
| | 13 | Nb2O5/SiO2 | 830.0 | 1.623 | 0.25λ | 127.90 |
| | 14 | Nb2O5 | 830.0 | 2.170 | 0.25λ | 95.60 |
| | 15 | Nb2O5/SiO2 | 830.0 | 1.623 | 0.25λ | 127.90 |
| | 16 | Nb2O5 | 830.0 | 2.170 | 0.25λ | 95.60 |
| | 17 | Nb2O5/SiO2 | 840.0 | 1.572 | 0.25λ | 133.60 |
| | 18 | ADHESIVE LAYER | — | — | — | — |
| | SUBSTRATE | BSC7 | — | — | — | — |

Next, a description is given of a case where only the second multilayer film of practical example 1 is employed.

On the substrate of practical example 1 (substrate at the top part of Table 1) is provided a sandwich-use mid refractive index film, corresponding to layer number 1 (center wavelength λ0=840 nm, substance: Nb2O5/SiO2, refractive index 1.572, physical film thickness: 133.60 nm). On top of this is provided the second multilayer film including 14 layers corresponding layer numbers 16 through 29 of practical example 1. On top of this is provided a dielectric film as the single-layer dielectric film that is the same as the dielectric film corresponding to layer number 16 of practical example 1 (center wavelength 830 nm, substance: $Nb_2O_5$, refractive index 2.170, physical film thickness: 95.60 nm), thereby forming 16 layers. On top of this is provided a sandwich-use mid refractive index film, which is the same as that of layer number 1, thereby forming a polarization split film with a Layer numbers 2 through 15 in Table 3 correspond to layer numbers 16 through 29 in practical example 1.

FIG. 10 illustrates the transmittance of P polarization (curve 10-1) and the transmittance of S polarization (curve 10-2) in the aforementioned case. A favorable polarization-splitting function is attained at a wavelength region centering around 581 nm.

Next, a description is given of a case where only the third multilayer film of practical example 1 is employed.

On the substrate of practical example 1 (substrate at the top part of Table 1) is provided a sandwich-use mid refractive index film, corresponding to layer number 1 (center wavelength λ0-840 nm, substance: Nb2O5/SiO2, refractive index 1.572, physical film thickness: 133.60 nm). On top of this is provided the third multilayer film including 14 layers corresponding layer numbers 30 through 43 of practical example 1. On top of this is provided a dielectric film as the single-layer dielectric film that is the same as the dielectric film corresponding to layer number 30 of practical example 1 (center wavelength 940 nm, substance: Nb$_2$O$_5$, refractive index 2.159, physical film thickness: 108.80 nm), thereby forming 16 layers. On top of this is provided a sandwich-use mid refractive index film, which is the same as that of layer number 1, thereby forming a polarization split film with a total of 17 layers. The sandwich-use mid refractive index film deposited last is adhered to the other substrate (substrate at bottom of Table 1) with the adhesive layer.

Table 4 shows this configuration, in accordance with Table 1.

TABLE 4

| | LAYER | SUBSTANCE | CENTER WAVELENGTH λ0 | REFRACTIVE INDEX n | FILM THICKNESS nd | PHYSICAL FILM THICKNESS d(nm) |
|---|---|---|---|---|---|---|
| | SUBSTRATE | BSC7 | — | — | — | — |
| | 1 | Nb2O5/SiO2 | 840.0 | 1.572 | 0.25λ | 133.60 |
| THIRD | 2 | Nb2O5 | 940.0 | 2.159 | 0.25λ | 108.80 |
| MULTILAYER | 3 | Nb2O5/SiO2 | 940.0 | 1.616 | 0.25λ | 145.40 |
| FILM | 4 | Nb2O5 | 940.0 | 2.159 | 0.25λ | 108.80 |
| | 5 | Nb2O5/SiO2 | 940.0 | 1.616 | 0.25λ | 145.40 |
| | 6 | Nb2O5 | 940.0 | 2.159 | 0.25λ | 108.80 |
| | 7 | Nb2O5/SiO2 | 940.0 | 1.616 | 0.25λ | 145.40 |
| | 8 | Nb2O5 | 940.0 | 2.159 | 0.25λ | 108.80 |
| | 9 | Nb2O5/SiO2 | 940.0 | 1.616 | 0.25λ | 145.40 |
| | 10 | Nb2O5 | 940.0 | 2.159 | 0.25λ | 108.80 |
| | 11 | Nb2O5/SiO2 | 940.0 | 1.616 | 0.25λ | 145.40 |
| | 12 | Nb2O5 | 940.0 | 2.159 | 0.25λ | 108.80 |
| | 13 | Nb2O5/SiO2 | 940.0 | 1.616 | 0.25λ | 145.40 |
| | 14 | Nb2O5 | 940.0 | 2.159 | 0.25λ | 108.80 |
| | 15 | Nb2O5/SiO2 | 940.0 | 1.616 | 0.25λ | 145.40 |
| | 16 | Nb2O5 | 940.0 | 2.159 | 0.25λ | 108.80 |
| | 17 | Nb2O5/SiO2 | 840.0 | 1.572 | 0.25λ | 133.60 |
| | 18 | ADHESIVE LAYER | — | — | — | — |
| | SUBSTRATE | BSC7 | — | — | — | — |

Layer numbers 2 through 15 in Table 4 correspond to layer numbers 30 through 43 in practical example 1.

FIG. 11 illustrates the transmittance of P polarization (curve 11-1) and the transmittance of S polarization (curve 11-2) in the aforementioned case. A favorable polarization-splitting function is attained at a wavelength region centering around 658 nm.

Next, a description is given of modification 10, which is a modification of practical example 1. In modification 10, the first and second multilayer films of practical example 1 are combined.

<Modification 10>

On the substrate of practical example 1 (substrate at the top part of Table 1) is provided a sandwich-use mid refractive index film, corresponding to layer number 1 (center wavelength λ0=840 nm, substance: Nb2O5/SiO2, refractive index 1.572, physical film thickness: 133.60 nm). On top of this is provided the first multilayer film including 14 layers corresponding layer numbers 2 through 15 of practical example 1. On top of this is provided the second multilayer film including 14 layers corresponding layer numbers 16 through 29 of practical example 1. On top of this is provided a dielectric film as the single-layer dielectric film that is the same as the dielectric film corresponding to layer number 16 (center wavelength 830 nm, substance: Nb$_2$O$_5$, refractive index 2.170, physical film thickness: 95.60 nm), thereby forming 30 layers. On top of this is provided a sandwich-use mid refractive index film, which is the same as that of layer number 1, thereby forming a polarization split film with a total of 31 layers. The sandwich-use mid refractive index film deposited last is adhered to the other substrate (substrate at bottom of Table 1) with the adhesive layer.

Table 5 shows this configuration, in accordance with Table 1.

TABLE 5

| | LAYER | SUBSTANCE | CENTER WAVELENGTH λ0 | REFRACTIVE INDEX n | FILM THICKNESS nd | PHYSICAL FILM THICKNESS d(nm) |
|---|---|---|---|---|---|---|
| | SUBSTRATE | BSC7 | — | — | — | — |
| | 1 | Nb2O5/SiO2 | 840.0 | 1.572 | 0.25λ | 133.60 |
| FIRST | 2 | Nb2O5 | 610.0 | 2.213 | 0.25λ | 68.90 |
| MULTILAYER | 3 | Nb2O5/SiO2 | 610.0 | 1.613 | 0.25λ | 94.60 |
| FILM | 4 | Nb2O5 | 610.0 | 2.213 | 0.25λ | 68.90 |
| | 5 | Nb2O5/SiO2 | 610.0 | 1.613 | 0.25λ | 94.60 |
| | 6 | Nb2O5 | 610.0 | 2.213 | 0.25λ | 68.90 |
| | 7 | Nb2O5/SiO2 | 610.0 | 1.613 | 0.25λ | 94.60 |
| | 8 | Nb2O5 | 610.0 | 2.213 | 0.25λ | 68.90 |
| | 9 | Nb2O5/SiO2 | 610.0 | 1.613 | 0.25λ | 94.60 |
| | 10 | Nb2O5 | 610.0 | 2.213 | 0.25λ | 68.90 |
| | 11 | Nb2O5/SiO2 | 610.0 | 1.613 | 0.25λ | 94.60 |
| | 12 | Nb2O5 | 610.0 | 2.213 | 0.25λ | 68.90 |
| | 13 | Nb2O5/SiO2 | 610.0 | 1.613 | 0.25λ | 94.60 |

TABLE 5-continued

| | LAYER | SUBSTANCE | CENTER WAVELENGTH $\lambda 0$ | REFRACTIVE INDEX n | FILM THICKNESS nd | PHYSICAL FILM THICKNESS d(nm) |
|---|---|---|---|---|---|---|
| | 14 | Nb2O5 | 610.0 | 2.213 | 0.25$\lambda$ | 68.90 |
| | 15 | Nb2O5/SiO2 | 610.0 | 1.613 | 0.25$\lambda$ | 94.60 |
| SECOND MULTILAYER FILM | 16 | Nb2O5 | 830.0 | 2.170 | 0.25$\lambda$ | 95.60 |
| | 17 | Nb2O5/SiO2 | 830.0 | 1.623 | 0.25$\lambda$ | 127.90 |
| | 18 | Nb2O5 | 830.0 | 2.170 | 0.25$\lambda$ | 95.60 |
| | 19 | Nb2O5/SiO2 | 830.0 | 1.623 | 0.25$\lambda$ | 127.90 |
| | 20 | Nb2O5 | 830.0 | 2.170 | 0.25$\lambda$ | 95.60 |
| | 21 | Nb2O5/SiO2 | 830.0 | 1.623 | 0.25$\lambda$ | 127.90 |
| | 22 | Nb2O5 | 830.0 | 2.170 | 0.25$\lambda$ | 95.60 |
| | 23 | Nb2O5/SiO2 | 830.0 | 1.623 | 0.25$\lambda$ | 127.90 |
| | 24 | Nb2O5 | 830.0 | 2.170 | 0.25$\lambda$ | 95.60 |
| | 25 | Nb2O5/SiO2 | 830.0 | 1.623 | 0.25$\lambda$ | 127.90 |
| | 26 | Nb2O5 | 830.0 | 2.170 | 0.25$\lambda$ | 95.60 |
| | 27 | Nb2O5/SiO2 | 830.0 | 1.623 | 0.25$\lambda$ | 127.90 |
| | 28 | Nb2O5 | 830.0 | 2.170 | 0.25$\lambda$ | 95.60 |
| | 29 | Nb2O5/SiO2 | 830.0 | 1.623 | 0.25$\lambda$ | 127.90 |
| | 30 | Nb2O5 | 830.0 | 2.170 | 0.25$\lambda$ | 95.60 |
| | 31 | Nb2O5/SiO2 | 840.0 | 1.572 | 0.25$\lambda$ | 133.60 |
| | 32 | ADHESIVE LAYER | — | — | — | — |
| SUBSTRATE | | BSC7 | — | — | — | — |

Layer numbers 2 through 29 in Table 5 correspond to layer numbers 2 through 29 in practical example 1.

Figure 12:
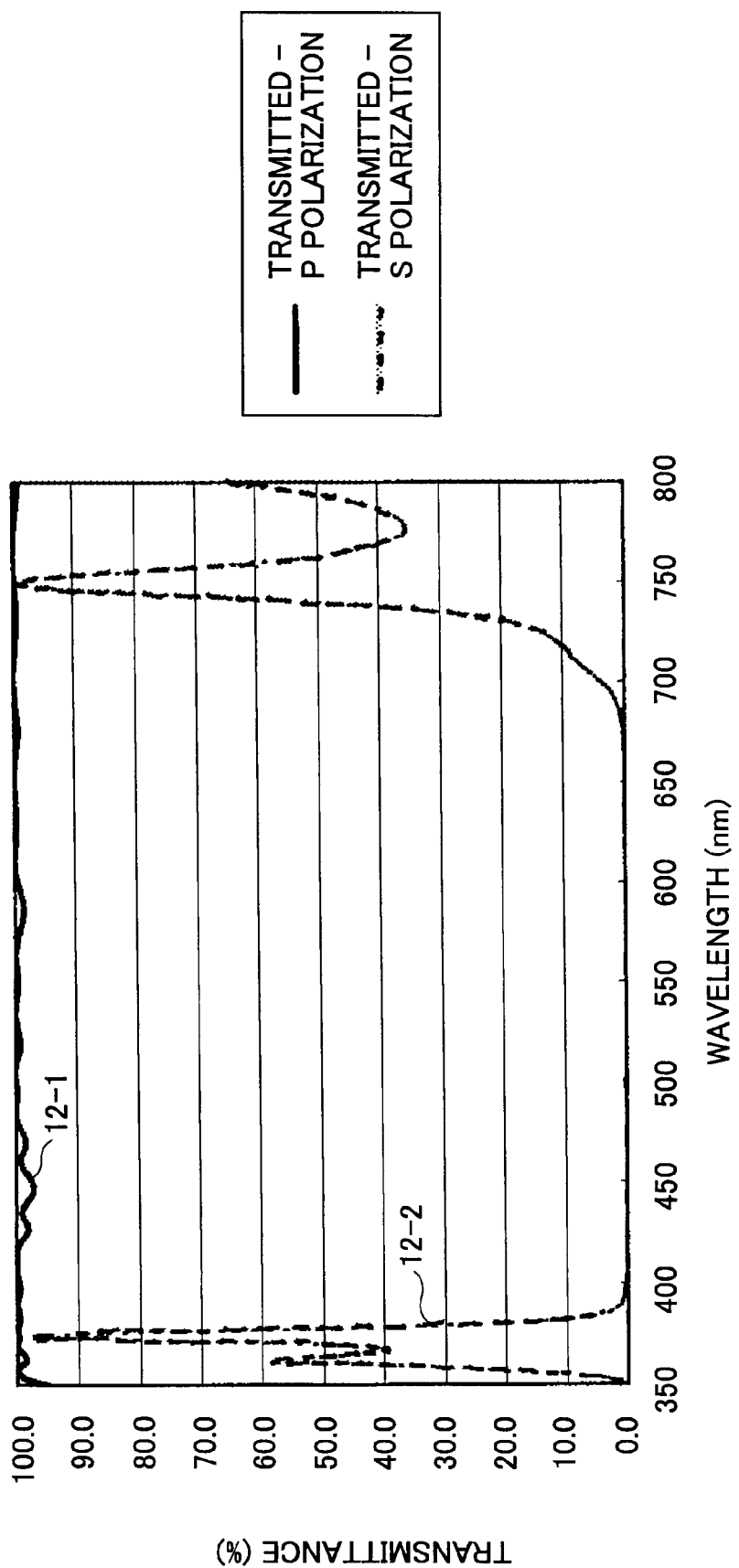
FIG. 12 is a chart for describing a polarization-splitting function of a polarization beam splitter according to practical example 10 of the present invention.

FIG. 12 illustrates the transmittance of P polarization (curve 12-1) and the transmittance of S polarization (curve 12-2) in the aforementioned case. The transmittance of P polarization is 97% or more in a wavelength range of 400 nm through 800 nm and the transmittance of S polarization is substantially 0% in a wavelength range of 400 nm through 650 nm. FIG. 12 shows the products of polarization-splitting properties of FIG. 9 and FIG. 10.

In this case, the wavelength region in which polarization-splitting can be performed is 400 nm through 650 nm, which is slightly narrower than the wavelength range of 380 nm through 780 nm of practical example 1. Nevertheless, this wavelength region (400 nm through 650 nm) substantially covers the visible wavelength region, and can thus tolerate practical use as a polarization beam splitter.

That is, the polarization beam splitter according to an embodiment of the present invention will be satisfactory as long as it includes at least two dielectric multilayer films having different design basis wavelengths, as in modification 10.

Products of polarization-splitting properties of FIGS. 9, 10, and 11 correspond to the polarization-splitting properties of practical example 1 shown in FIG. 2.

A description is given of a case where the second and third multilayer films of practical example 1 are combined. On the substrate of practical example 1 (substrate at the top part of Table 1) is provided a sandwich-use mid refractive index film, corresponding to layer number 1 (center wavelength $\lambda 0$=840 nm, substance: Nb2O5/SiO2, refractive index 1.572, physical film thickness: 133.60 nm). On top of this is provided the second multilayer film including 14 layers corresponding layer numbers 16 through 29 of practical example 1. On top of this is provided the third multilayer film including 14 layers corresponding layer numbers 30 through 43 of practical example 1. On top of this is provided a dielectric film as the single-layer dielectric film that is the same as the dielectric film corresponding to layer number 30 of practical example 1 (center wavelength 940 nm, substance: $Nb_2O_5$, refractive index 2.159, physical film thickness: 108.80 nm), thereby forming 30 layers. On top of this is provided a sandwich-use mid refractive index film, which is the same as that of layer number 1, and the sandwich-use mid refractive index film deposited last is adhered to the other substrate (substrate at bottom of Table 1) with the adhesive layer.

Table 6 shows this configuration, in accordance with Table 1.

TABLE 6

| | LAYER | SUBSTANCE | CENTER WAVELENGTH $\lambda 0$ | REFRACTIVE INDEX n | FILM THICKNESS nd | PHYSICAL FILM THICKNESS d(nm) |
|---|---|---|---|---|---|---|
| SUBSTRATE | | BSC7 | — | — | — | — |
| | 1 | Nb2O5/SiO2 | 840.0 | 1.572 | 0.25$\lambda$ | 133.60 |
| SECOND MULTILAYER FILM | 2 | Nb2O5 | 830.0 | 2.170 | 0.25$\lambda$ | 95.60 |
| | 3 | Nb2O5/SiO2 | 830.0 | 1.623 | 0.25$\lambda$ | 127.90 |
| | 4 | Nb2O5 | 830.0 | 2.170 | 0.25$\lambda$ | 95.60 |
| | 5 | Nb2O5/SiO2 | 830.0 | 1.623 | 0.25$\lambda$ | 127.90 |
| | 6 | Nb2O5 | 830.0 | 2.170 | 0.25$\lambda$ | 95.60 |
| | 7 | Nb2O5/SiO2 | 830.0 | 1.623 | 0.25$\lambda$ | 127.90 |
| | 8 | Nb2O5 | 830.0 | 2.170 | 0.25$\lambda$ | 95.60 |
| | 9 | Nb2O5/SiO2 | 830.0 | 1.623 | 0.25$\lambda$ | 127.90 |
| | 10 | Nb2O5 | 830.0 | 2.170 | 0.25$\lambda$ | 95.60 |
| | 11 | Nb2O5/SiO2 | 830.0 | 1.623 | 0.25$\lambda$ | 127.90 |
| | 12 | Nb2O5 | 830.0 | 2.170 | 0.25$\lambda$ | 95.60 |

TABLE 6-continued

|  | LAYER | SUBSTANCE | CENTER WAVELENGTH λ0 | REFRACTIVE INDEX n | FILM THICKNESS nd | PHYSICAL FILM THICKNESS d(nm) |
|---|---|---|---|---|---|---|
|  | 13 | Nb2O5/SiO2 | 830.0 | 1.623 | 0.25λ | 127.90 |
|  | 14 | Nb2O5 | 830.0 | 2.170 | 0.25λ | 95.60 |
|  | 15 | Nb2O5/SiO2 | 830.0 | 1.623 | 0.25λ | 127.90 |
| THIRD | 16 | Nb2O5 | 940.0 | 2.159 | 0.25λ | 108.80 |
| MULTILAYER | 17 | Nb2O5/SiO2 | 940.0 | 1.616 | 0.25λ | 145.40 |
| FILM | 18 | Nb2O5 | 940.0 | 2.159 | 0.25λ | 108.80 |
|  | 19 | Nb2O5/SiO2 | 940.0 | 1.616 | 0.25λ | 145.40 |
|  | 20 | Nb2O5 | 940.0 | 2.159 | 0.25λ | 108.80 |
|  | 21 | Nb2O5/SiO2 | 940.0 | 1.616 | 0.25λ | 145.40 |
|  | 22 | Nb2O5 | 940.0 | 2.159 | 0.25λ | 108.80 |
|  | 23 | Nb2O5/SiO2 | 940.0 | 1.616 | 0.25λ | 145.40 |
|  | 24 | Nb2O5 | 940.0 | 2.159 | 0.25λ | 108.80 |
|  | 25 | Nb2O5/SiO2 | 940.0 | 1.616 | 0.25λ | 145.40 |
|  | 26 | Nb2O5 | 940.0 | 2.159 | 0.25λ | 108.80 |
|  | 27 | Nb2O5/SiO2 | 940.0 | 1.616 | 0.25λ | 145.40 |
|  | 28 | Nb2O5 | 940.0 | 2.159 | 0.25λ | 108.80 |
|  | 29 | Nb2O5/SiO2 | 940.0 | 1.616 | 0.25λ | 145.40 |
|  | 30 | Nb2O5 | 940.0 | 2.159 | 0.25λ | 108.80 |
|  | 31 | Nb2O5/SiO2 | 840.0 | 1.572 | 0.25λ | 133.60 |
|  | 32 | ADHESIVE LAYER | — | — | — | — |
|  | SUBSTRATE | BSC7 | — | — | — | — |

Layer numbers 2 through 29 in Table 6 correspond to layer numbers 16 through 43 in practical example 1.

As shown in FIG. 13, the polarization-splitting properties in this case correspond to products of polarization-splitting properties of FIG. 10 and FIG. 11. In the present case, the transmittance of P polarization (curve 13-1) is favorable, but the transmittance of S polarization (curve 13-2) becomes large in a short wavelength region of 400 nm through 530 nm. Hence, a polarization-splitting function cannot be realized over the entire visible wavelength region. However, with respect light within the wavelength range of 530 nm through 780 nm, an effective polarization-splitting function can be attained. Therefore, the polarization beam splitter can be favorably used as a polarization color filter that separates a green color component from visible light.

Furthermore, the number of laminated layers included in each of the two or more dielectric multilayer films in the polarization split film of the polarization beam splitter according to an embodiment of the present invention is 8 through 20, preferably 12 through 16. In practical example 1 and the above-described modifications thereof, the number of laminated layers of dielectric films in each dielectric multilayer film is 14. In modification 11, the number laminated layers of dielectric films is 12. In modification 12, the number laminated layers of dielectric films is 10.

<Modification 11>

In modification 11, the first multilayer film, described in practical example 1, has 12 layers of dielectric films corresponding to layer numbers 2 through 13 of practical example 1. In modification 11, the second multilayer film, described in practical example 1, has 12 layers of dielectric films corresponding to layer numbers 16 through 27 of practical example 1. In modification 11, the third multilayer film, described in practical example 1, has 12 layers of dielectric films corresponding to layer numbers 30 through 41 of practical example 1. On top of the third multilayer film is provided a dielectric film corresponding to layer number 44 of practical example 1 as the single-layer dielectric film (the same as the first dielectric film layer in the third multilayer film, i.e., the dielectric film of layer number 30). On top of this, the substrate is provided via the sandwich-use mid refractive index film corresponding to layer number 45 of practical example 1 and an adhesive layer.

FIG. 14 illustrates the transmittance of P polarization (curve 14-1) and the transmittance of S polarization (curve 14-2) of modification 11. The transmittance of P polarization is 97% or more in a wavelength range of 400 nm through 800 nm and the transmittance of S polarization is substantially 0% in a wavelength range of 400 nm through 750 nm, which is a sufficient polarization-splitting function with respect to light in the visible wavelength region.

<Modification 12>

In modification 12, the first multilayer film described in practical example 1 has 10 layers of dielectric films corresponding to layer numbers 2 through 11 of practical example 1. In modification 12, the second multilayer film described in practical example 1 has 10 layers of dielectric films corresponding to layer numbers 16 through 25 of practical example 1. In modification 12, the third multilayer film described in practical example 1 has 10 layers of dielectric films corresponding to layer numbers 30 through 39 of practical example 1. On top of the third multilayer film is provided a dielectric film corresponding to layer number 44 of practical example 1 as the single-layer dielectric film (the same as the first dielectric film layer in the third multilayer film, i.e., the dielectric film of layer number 30). On top of this, the substrate is provided via the sandwich-use mid refractive index film corresponding to layer number 45 of practical example 1 and an adhesive layer.

FIG. 15 illustrates the transmittance of P polarization (curve 15-1) and the transmittance of S polarization (curve 15-2) of modification 12. The transmittance of P polarization is 97% or more in a wavelength range of 400 nm through 800 nm and the transmittance of S polarization is substantially 0% in a wavelength range of 400 nm through 750 nm, which is a sufficient polarization-splitting function with respect to light in the visible wavelength region. As is clear by comparing FIG. 14 and FIG. 15, when the number of laminated layers in the multilayer film is reduced, the transmittance of S polarization (curve 15-2) tends to increase in a short wavelength region denoted by reference numeral 15a and in a long wavelength region denoted by reference numeral 15b in FIG. 15. Furthermore, as the number of laminated layers in the multilayer film decreases, the wavelength range in which the polarization beam splitter can be effectively used will become narrower. In consideration of practical use in the visible wavelength region, the minimum number of laminated layers is to be around eight.

When the polarization beam splitter according to an embodiment of the present invention is used in a projector, the number of layers in each of the first through third multilayer films preferably falls in a range of 12 through 16, to satisfy the following design conditions: the incidence angle is 60 degrees; and in the visible wavelength region of 400 nm through 700 nm, the transmittance of P polarization is 95% or more and the transmittance of S polarization is less than 1%.

In practical example 1 and modifications thereof, it is assumed that the same number of laminated layers is provided in each of the dielectric multilayer films corresponding to different design basis wavelengths. Furthermore, the wavelength range is based on the entire visible region (400 nm through 700 nm). However, there are hardly any wavelength components that are less than or equal to 420 nm, or greater than or equal to 680 nm, in an ultra-high pressure mercury lamp that is typically used in a projector. Hence, in the following studies, it is assumed that the effective wavelength range is 420 nm through 680 nm, the transmittance of S polarization is less than 5% (the same as the case where there are eight laminated layers as described above), and that there can be any number of laminated layers in each basis wavelength. Accordingly, the total number of layers can be further reduced.

Modifications 13 and 14 described below have such configurations.

<Modification 13>

In a polarization beam splitter according to modification 13, the first multilayer film of practical example 1 has eight layers in modification 13, the second multilayer film of practical example 1 has six layers in modification 13, and the third multilayer film of practical example 1 has four layers in modification 13.

Table 7 shows this configuration, in accordance with Table 1.

FIG. 17 is similar to FIG. 2, showing properties of a polarization-splitting function of the polarization beam splitter according to modification 13.

In the properties of the polarization-splitting function shown in FIG. 17, in a wavelength range of 420 nm through 680 nm, the transmittance of P polarization (curve 17-1) is 98% or more (99% or more on average) and the transmittance of S polarization (curve 17-2) is 3% or less (1% or less on average), which are sufficient properties for practical use.

Similar properties of the polarization splitting function as those shown in FIG. 17 can be attained when eight layers are included in the first multilayer film and 10 layers are included in the second and third multilayer films added together.

If the number of laminated layers in each of the multiyear films is further reduced from those of modification 13, the performance of the polarization beam splitter will be degraded. The limit at which the polarization beam splitter can tolerate practical use may vary according to required specifications of the system to be used, and therefore such a limit cannot be generalized. However, assuming that the limit of the transmittance of S polarization is around 10% (around 3% on average) in a wavelength range of 420 nm through 680 nm, the number of laminated layers can be reduced to six layers in the first multilayer film and eight layers in the second and third multilayer films added together (i.e., the total of the number of laminated layers in the second multilayer film and the number of laminated layers in the third multilayer film).

<Modification 14>

In a polarization beam splitter according to modification 14, the first multilayer film of practical example 1 has six layers in modification 14, the second multilayer film of practical example 1 has six layers in modification 14, and the third multilayer film of practical example 1 has two layers in modification 14.

TABLE 7

| | LAYER | SUBSTANCE | CENTER WAVELENGTH $\lambda 0$ | REFRACTIVE INDEX n | FILM THICKNESS nd | PHYSICAL FILM THICKNESS d(nm) |
|---|---|---|---|---|---|---|
| | SUBSTRATE | BSC7 | — | — | — | — |
| FIRST MULTILAYER FILM | 1 | Nb2O5/SiO2 | 840.0 | 1.572 | 0.25$\lambda$ | 133.60 |
| | 2 | Nb2O5 | 610.0 | 2.213 | 0.25$\lambda$ | 68.90 |
| | 3 | Nb2O5/SiO2 | 610.0 | 1.613 | 0.25$\lambda$ | 94.60 |
| | 4 | Nb2O5 | 610.0 | 2.213 | 0.25$\lambda$ | 68.90 |
| | 5 | Nb2O5/SiO2 | 610.0 | 1.613 | 0.25$\lambda$ | 94.60 |
| | 6 | Nb2O5 | 610.0 | 2.213 | 0.25$\lambda$ | 68.90 |
| | 7 | Nb2O5/SiO2 | 610.0 | 1.613 | 0.25$\lambda$ | 94.60 |
| | 8 | Nb2O5 | 610.0 | 2.213 | 0.25$\lambda$ | 68.90 |
| | 9 | Nb2O5/SiO2 | 610.0 | 1.613 | 0.25$\lambda$ | 94.60 |
| SECOND MULTILAYER FILM | 10 | Nb2O5 | 830.0 | 2.170 | 0.25$\lambda$ | 95.60 |
| | 11 | Nb2O5/SiO2 | 830.0 | 1.623 | 0.25$\lambda$ | 127.90 |
| | 12 | Nb2O5 | 830.0 | 2.170 | 0.25$\lambda$ | 95.60 |
| | 13 | Nb2O5/SiO2 | 830.0 | 1.623 | 0.25$\lambda$ | 127.90 |
| | 14 | Nb2O5 | 830.0 | 2.170 | 0.25$\lambda$ | 95.60 |
| | 15 | Nb2O5/SiO2 | 830.0 | 1.623 | 0.25$\lambda$ | 127.90 |
| THIRD MULTILAYER FILM | 16 | Nb2O5 | 940.0 | 2.159 | 0.25$\lambda$ | 108.80 |
| | 17 | Nb2O5/SiO2 | 940.0 | 1.616 | 0.25$\lambda$ | 145.40 |
| | 18 | Nb2O5 | 940.0 | 2.159 | 0.25$\lambda$ | 108.80 |
| | 19 | Nb2O5/SiO2 | 940.0 | 1.616 | 0.25$\lambda$ | 145.40 |
| | 20 | Nb2O5 | 940.0 | 2.159 | 0.25$\lambda$ | 108.80 |
| | 21 | Nb2O5/SiO2 | 840.0 | 1.572 | 0.25$\lambda$ | 133.60 |
| | 22 | ADHESIVE LAYER | — | — | — | — |
| | SUBSTRATE | BSC7 | — | — | — | — |

Table 8 shows this configuration, in accordance with Table 1.

certain wavelength region depending on the deposition conditions. As a result, properties of the polarization beam split-

TABLE 8

| | LAYER | SUBSTANCE | CENTER WAVELENGTH λ0 | REFRACTIVE INDEX n | FILM THICKNESS nd | PHYSICAL FILM THICKNESS d(nm) |
|---|---|---|---|---|---|---|
| | SUBSTRATE | BSC7 | — | — | — | — |
| | 1 | Nb2O5/SiO2 | 840.0 | 1.572 | 0.25λ | 133.60 |
| FIRST | 2 | Nb2O5 | 610.0 | 2.213 | 0.25λ | 68.90 |
| MULTI-LAYER | 3 | Nb2O5/SiO2 | 610.0 | 1.613 | 0.25λ | 94.60 |
| FILM | 4 | Nb2O5 | 610.0 | 2.213 | 0.25λ | 68.90 |
| | 5 | Nb2O5/SiO2 | 610.0 | 1.613 | 0.25λ | 94.60 |
| | 6 | Nb2O5 | 610.0 | 2.213 | 0.25λ | 68.90 |
| | 7 | Nb2O5/SiO2 | 610.0 | 1.613 | 0.25λ | 94.60 |
| SECOND | 8 | Nb2O5 | 830.0 | 2.170 | 0.25λ | 95.60 |
| MULTILAYER | 9 | Nb2O5/SiO2 | 830.0 | 1.623 | 0.25λ | 127.90 |
| FILM | 10 | Nb2O5 | 830.0 | 2.170 | 0.25λ | 95.60 |
| | 11 | Nb2O5/SiO2 | 830.0 | 1.623 | 0.25λ | 127.90 |
| | 12 | Nb2O5 | 830.0 | 2.170 | 0.25λ | 95.60 |
| | 13 | Nb2O5/SiO2 | 830.0 | 1.623 | 0.25λ | 127.90 |
| THIRD | 14 | Nb2O5 | 940.0 | 2.159 | 0.25λ | 108.80 |
| MULTILAYER | 15 | Nb2O5/SiO2 | 940.0 | 1.616 | 0.25λ | 145.40 |
| FILM | 16 | Nb2O5 | 940.0 | 2.159 | 0.25λ | 108.80 |
| | 17 | Nb2O5/SiO2 | 840.0 | 1.572 | 0.25λ | 133.60 |
| | 18 | ADHESIVE LAYER | — | — | — | — |
| | SUBSTRATE | BSC7 | — | — | — | — |

FIG. 18 is also similar to FIG. 2, showing properties of a polarization-splitting function of the polarization beam splitter according to modification 14. In the properties of the polarization-splitting function shown in FIG. 18, in a wavelength range of 420 nm through 680 nm, the transmittance of P polarization (curve 18-1) is 98% or more (99% or more on average) and the transmittance of S polarization (curve 18-2) is 10% at maximum (approximately 3% on average).

Whether these values can tolerate practical use depends on spectral properties of a lamp to be used or required specifications of the entire optical system. Hence, there may be a case where the polarization splitting function of modification 13 does not satisfy conditions for practical use. Conversely, even if the values are worse than those of the polarization split function of modification 14, the conditions for practical use may be satisfied.

That is, in a polarization beam splitter applicable to a system including a light source that has a limited wavelength region such as an LED used for illumination, it is not necessary to attain favorable properties across the entire visible region. It is satisfactory as long as favorable properties are attained in a wavelength region corresponding to the wavelength of the LED to be used. Accordingly, practical use will not be hampered by reducing the number of laminated layers in each multilayer film of the polarization beam splitter, as long as favorable properties of the polarization splitting function can be attained in the wavelength region that is actually necessary.

Cost reduction is not the only advantage gained by reducing the number of laminated layers in each multilayer film of the polarization beam splitter. If absorption occurs in films of the multilayer film included in the polarization beam splitter, the polarization beam splitter properties will be degraded due to such absorption. However, by reducing the number of laminated layers in each multilayer film, the degradation will be will be effectively mitigated.

For example, in the mixture layer of $Nb_2O_5$ and $SiO_2$ acting as the mid refractive index film included in the polarization beam splitter according to practical examples or modifications of the present invention, absorption may occur in a certain wavelength region depending on the deposition conditions. However, by reducing the number of mid refractive index films that cause such absorption, it is possible to mitigate the extent of degradation in corresponding properties.

Figure 19:
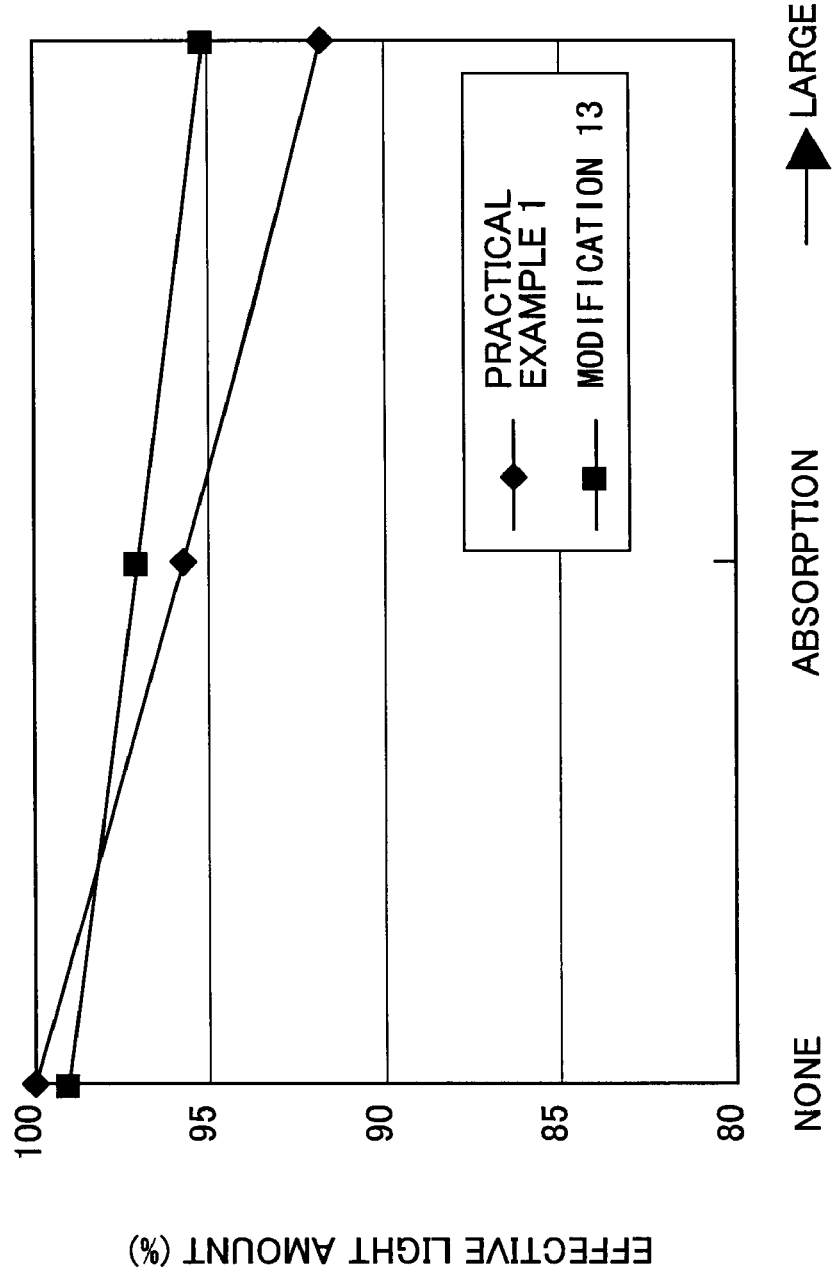
FIG. 19 is a chart for comparing changes in properties of the polarization beam splitter according to practical example 1 and the polarization beam splitter according to modification 13 when absorption occurs in the films.

FIG. 19 is a chart for comparing properties of the polarization beam splitter according to practical example 1 (having a combination of 14 layers, 14 layers, and 14 layers) and the polarization beam splitter according to modification (having a combination of eight layers, six layers, and four layers), when absorption occurs in the films.

As shown in FIG. 19, when absorption is not occurring in the films (on the left edge when viewed in the figure), a larger amount of effective light can be obtained in practical example 1 than in modification 13. However, as the extent of absorption increases in the films (toward the right when viewed in the figure), practical example 1 shows a larger decrement in the effective light amount compared to modification 13. Accordingly, when the absorption in the films increases to some extent, the effective light amount of modification 13 is relatively larger than that of practical example 1, and therefore the superiority in performance of these two examples is reversed. Thus, as long as no problems arise with respect to the required specifications of the system in which the polarization beam splitter is to be used, it is advantageous to reduce the number of laminated layers in each multilayer film. Specifically, a low-cost polarization beam splitter including multilayer films can be provided, which is capable of effectively mitigating degradation in polarization beam splitter properties caused by absorption in the films.

As is clear from FIGS. 17 and 18, the transmittance of S polarization primarily determines the performance of the polarization beam splitter.

FIGS. 20A through 20F are charts plotting the maximum values (hereinafter, "max values") of the transmittance of S polarization with respect to different combinations of numbers of laminated layers included in respective ones of the first multilayer film through the third multilayer film.

Figure 20A:
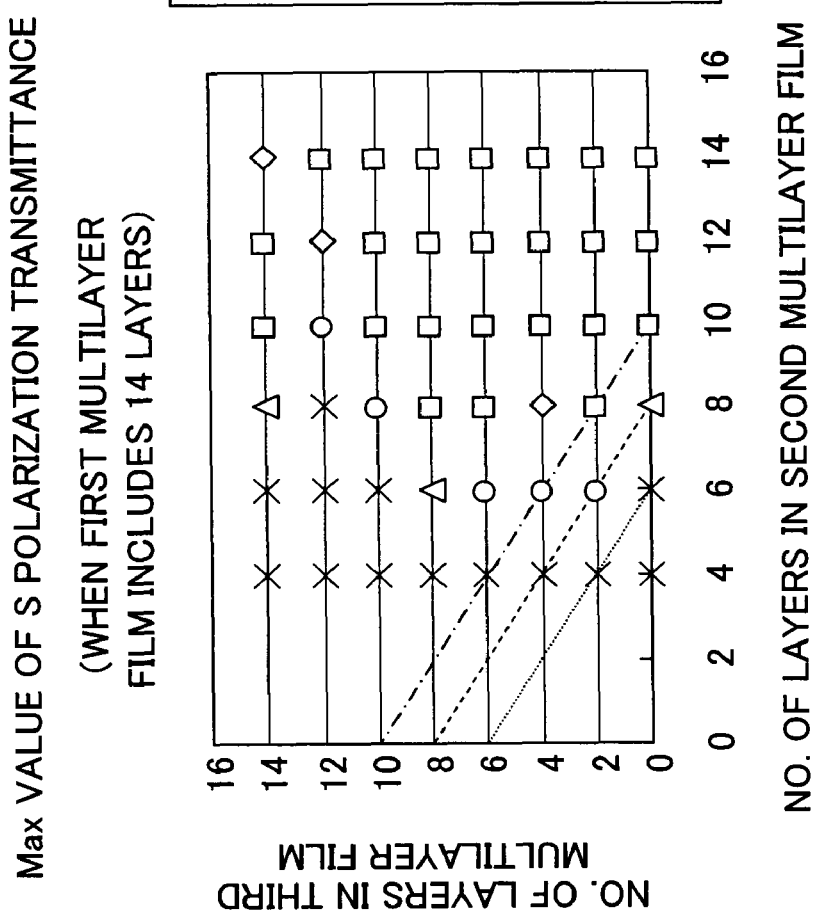
Figure 20B:
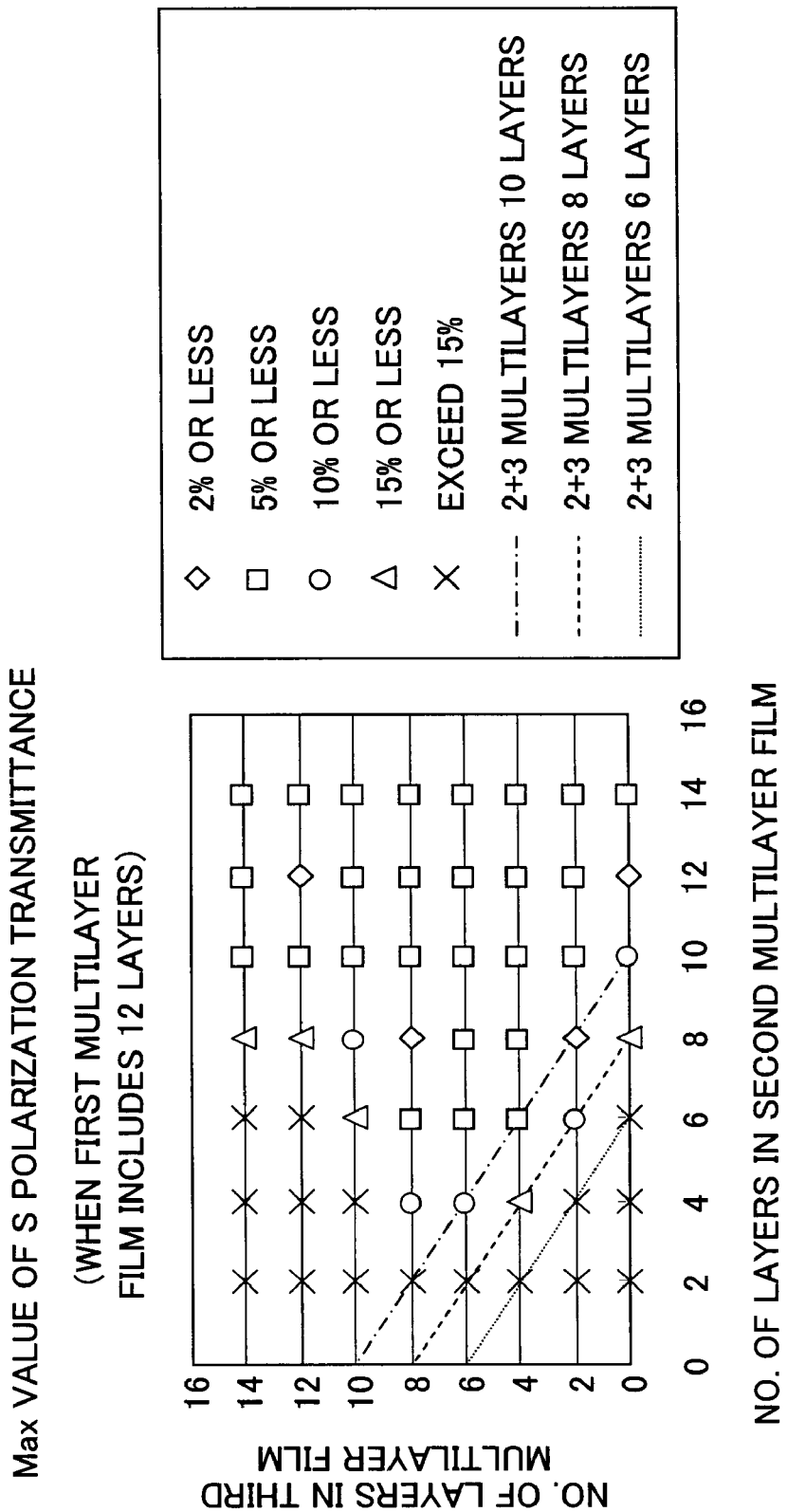
Figure 20C:
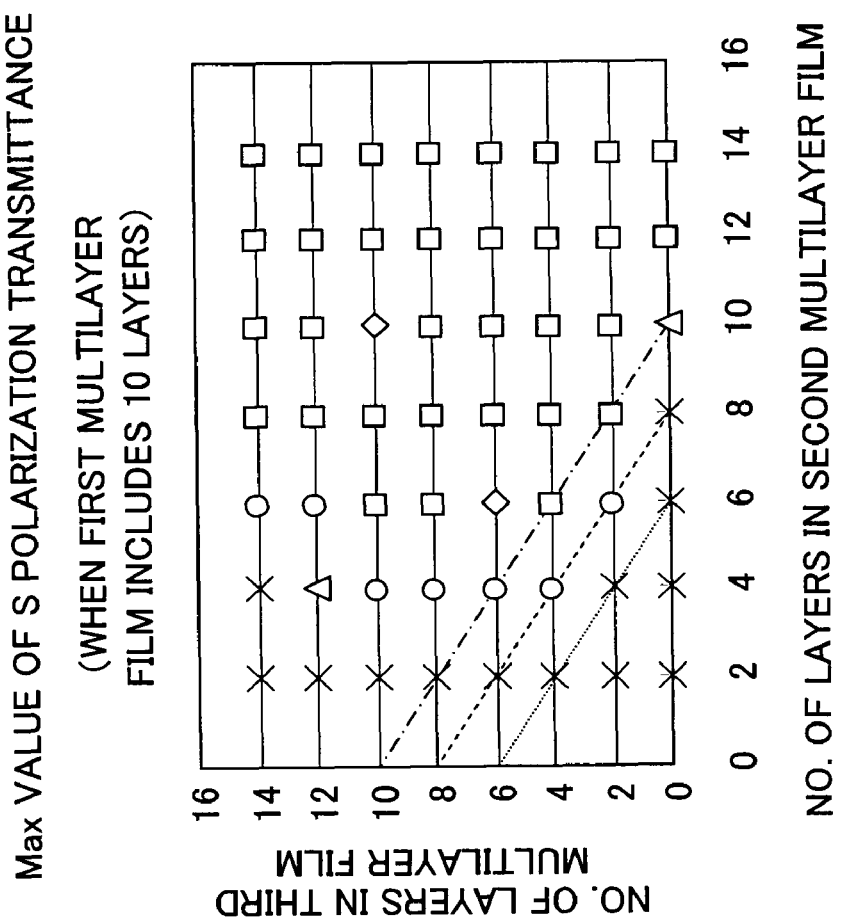
Figure 20D:
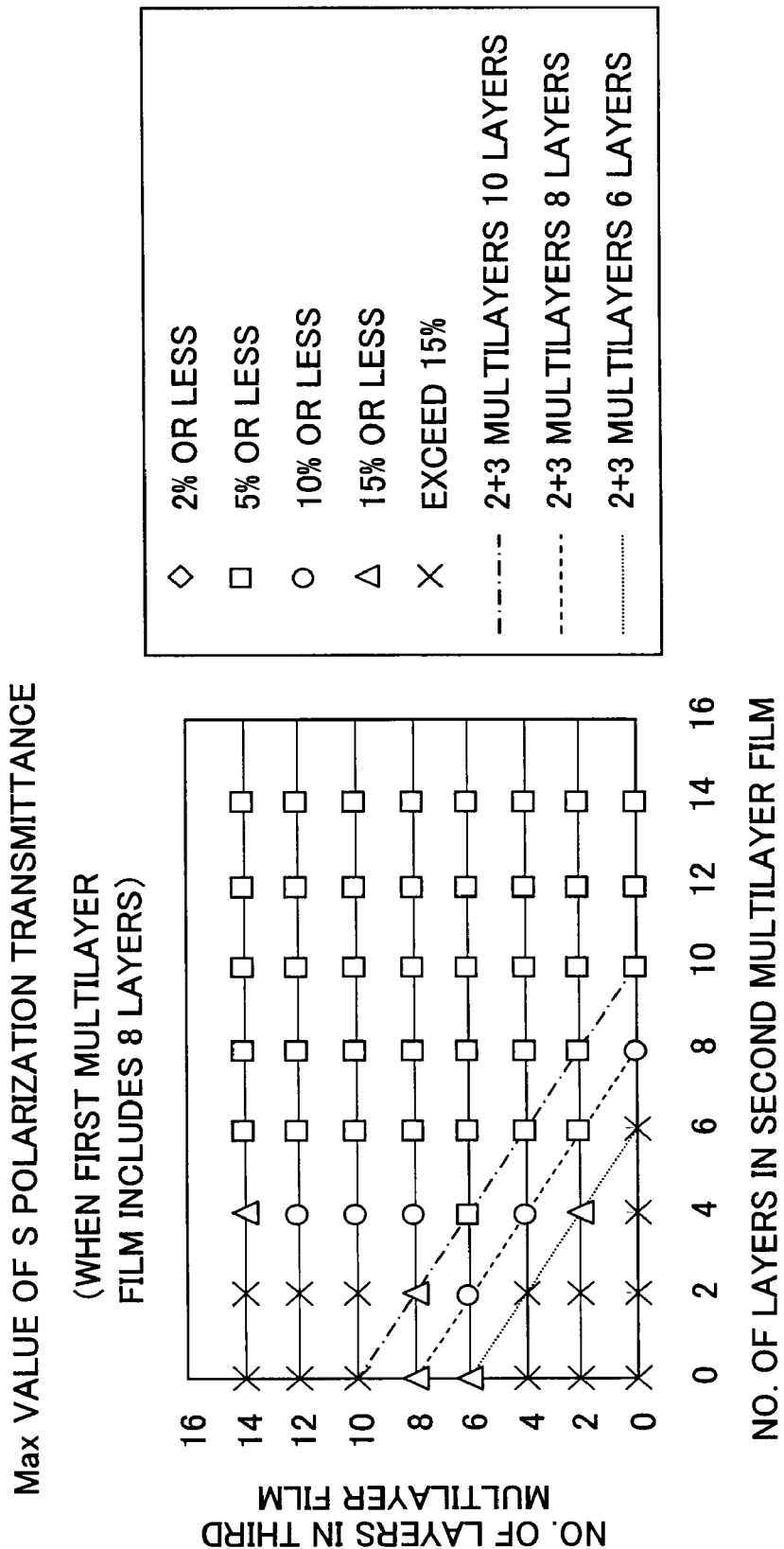
Figure 20F:
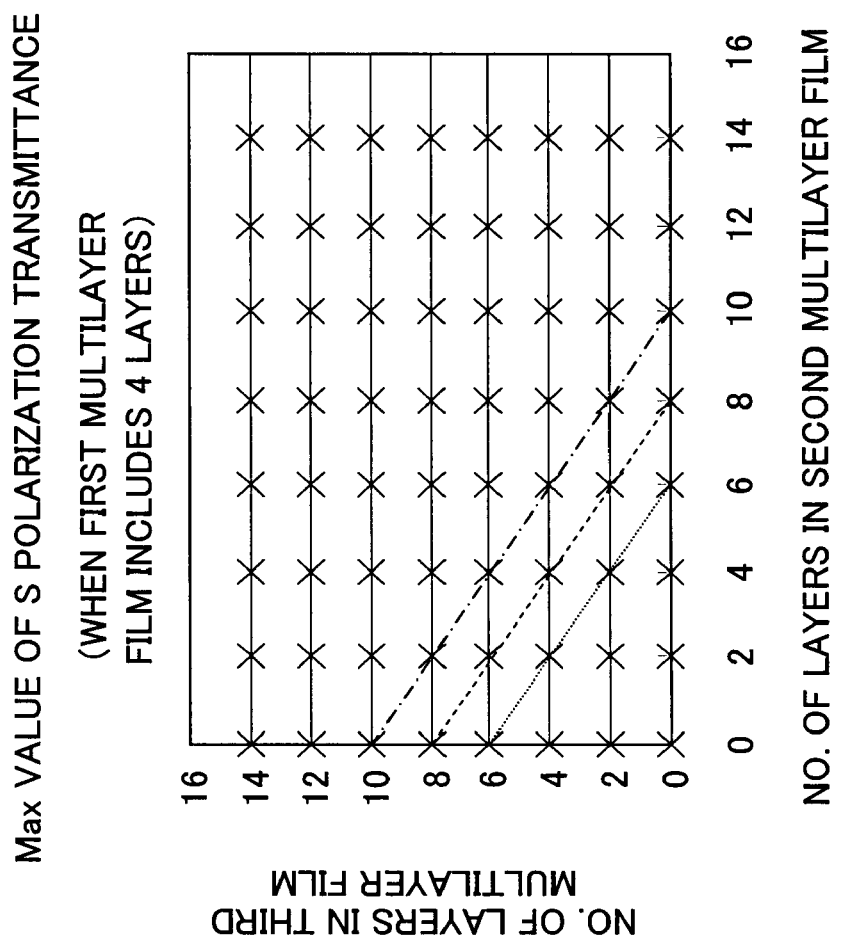

Referring to FIGS. 20A through 20F, if the number of laminated layers in the first multilayer film is eight layers or more (FIGS. 20A through 20D), the max value of the transmittance of S polarization will be 5% or less by selecting an appropriate number of layers in each of the second and third multilayer films. However, if the first multilayer film has six layers, the max value of the transmittance of S polarization will be 10% through 15% (FIG. 20E), and if the first multilayer film has four layers, the max value of the transmittance of S polarization will exceed 15% (FIG. 20F). The limit in the transmittance of S polarization is considered to be 10% through 15% to tolerate practical use. Therefore, the number of laminated layers in the first multilayer film is to be at least six layers. To attain higher performance, the number of laminated layers in the first multilayer film is to be at least eight layers or more.

With regard to the second multilayer film and the third multilayer film, the number of laminated layers in the second multilayer film+the third multilayer film is to be at least six layers (when the first multilayer film includes six layers or eight layers as in FIGS. 20E and 20D, respectively). To attain high performance, the number of laminated layers in the second multilayer film+the third multilayer film is to be at least 10 layers. An S polarization transmittance of 5% can be attained when the first multilayer film includes eight layers (FIG. 20D) and the second multilayer film+the third multilayer film includes eight layers (six layers in the second multilayer film and two layers in the third multilayer film). To stably attain a S polarization transmittance of 5% or less, it is considered that 10 layers are to be included in the second multilayer film+the third multilayer film.

Thus, to attain a desired level of performance, the minimum numbers of layers in each of the multilayer films are to be as follows: the first multilayer film includes six layers and the second multilayer film+the third multilayer film includes six layers; or the first multilayer film includes eight layers and the second multilayer film+the third multilayer film includes 10 layers.

As shown in FIGS. 20A through 20F, as the aforementioned number of laminated layers are increased, the performance will be further enhanced. Therefore, theoretically, there is no such thing as an upper limit in the number of laminated layers in consideration of performance. However, if there is an enormously vast number of laminated layers (such as over 100 layers), the actual performance may be degraded due to absorption. As a matter of practicality, the required minimum number of laminated layers is to be deposited in consideration of manufacturing efficiency and cost. Accordingly, it is meaningless to set an upper limit; there is significance in setting the aforementioned lower limit. Furthermore, the lower limit in the number of laminated layers is not limited to the above, because under actual circumstances, there may be irregularities in the device or materials when depositing the layers. Therefore, there needs to be freedom for increasing the number of laminated layers, in order to stably attain desirable performance.

In practical example 1, the sandwich-use mid refractive index film, the first through third multilayer films, and the single-layer film are formed and laminated starting from the side of the transparent substrate 11 in FIG. 1. The sandwich-use mid refractive index film formed last (layer number 45) is adhered to the other transparent substrate by an adhesive layer (layer number 46). Conversely, it is possible to start forming and laminating the dielectric films of practical example 1 from the other transparent substrate (in an order starting from layer number 45 toward layer number 1), and the sandwich-use mid refractive index film of layer number 1 can be adhered to the top transparent substrate by an adhesive layer.

In this case, the dielectric films corresponding to layer numbers 44 through 31 of practical example 1 are included in the first multilayer film. The dielectric films corresponding to layer numbers 30 through 17 of practical example 1 are included in the second multilayer film. The dielectric films corresponding to layer numbers 16 through 3 of practical example 1 are included in the third multilayer film. The dielectric film corresponding to layer number 2 of practical example 1 acts as the single-layer dielectric film.

Figure 16A:
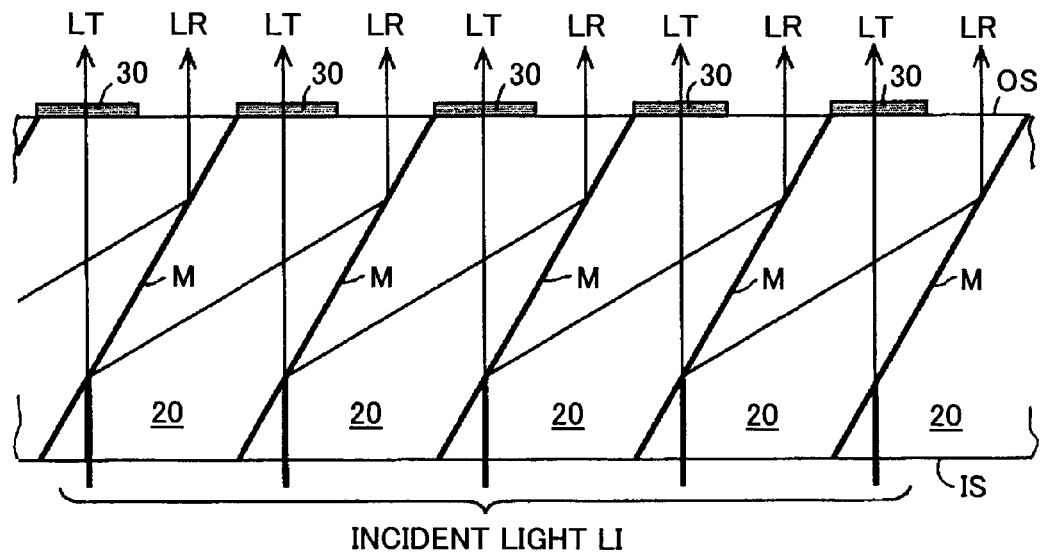
FIG. 16A illustrates a polarization conversion element according to an embodiment of the present invention and FIG. 16B illustrates a conventional polarization conversion element.

FIG. 16A illustrates a polarization conversion element according to an embodiment of the present invention.

The polarization conversion element shown in FIG. 16A is an optical element for receiving the incident light LI, which is natural light or light in a random polarization state, and emitting light beams having common polarization directions.

Reference letters IS denote an incidence surface, and the incident light LI is orthogonally incident on the incidence surface IS. Reference letters OS denote an exit surface. The incidence surface IS and the exit surface OS are parallel to each other.

The portions denoted by reference numeral 20 indicate transparent substrates, and reference letter M denotes polarization split films (specifically, the polarization split film M includes at least two or more types of dielectric multilayer films, a single-layer dielectric film, and an adhesive layer, which are sandwiched between sandwich-use mid refractive index films as described in practical example 1 and modification examples 2 through 13).

The plural polarization split films M are equidistant and parallel to each other, thereby constituting a polarization split film array. Each transparent substrate 20 is provided between and shared by two adjacent polarization split films M.

Specifically, each polarization split film M is formed by being deposited on one of the two transparent substrates 20 between which the polarization split film M is sandwiched, and is adhered to the other transparent substrate 20 by an adhesive layer. That is, the polarization split film array, which includes the polarization split films M and the transparent substrates 20 provided in between the polarization split films M, form a configuration in which multiple tiers of polarization beam splitters according to any of the above-described examples are stacked onto each other, thereby forming a combined single body. Specifically, the shared transparent substrates 20 are cut along planes that are parallel to each other to form cut surfaces, each cut surface being at an angle of 60 degrees relative to the polarization split films M. The cut surfaces act as the incidence surface IS and the exit surface OS. Furthermore, the polarization split films M included in the polarization split film array are closely arranged to each other when viewed from directions orthogonal to the aforementioned cut surfaces (incidence surface/exit surface) (from the top and bottom directions when viewed in the figure).

When the incident light LI (described as collimated light beams as a matter of simplification) is applied to the polarization conversion element as shown in the figure, the incident light LI is incident on each polarization split film M at an incidence angle of 60 degrees. The above-described P polarization component passes through each polarization split film M as a transmitted light beam LT. Meanwhile, the S polarization component is reflected from each polarization split film M. The reflected S polarization component propagates through the transparent substrate 20, and is reflected once again from an adjacent polarization split film M, which is, when viewed in the figure, on the immediate right of the polarization split film M from which the S polarization component is first reflected. Then the S polarization component exits the exit surface OS as a reflected light beam LR that is parallel to the transmitted light beam LT. That is, both the transmitted light beam LT and the reflected light beam LR, which exit the exit surface OS, propagate in the same direction as the incident light LI.

On the exit surface OS of the polarization conversion element, there are provided equidistant ½ wavelength plates 30, each having a rectangular shape that is elongated in the direction orthogonal to the figure. Each ½ wavelength plate 30 is configured to spin around the polarization plane of the transmitted light beam LT by 90 degrees.

The width of each ½ wavelength plate 30 in the figure is half that of the interval between adjacent polarization split films M. As the transmitted light beam LT is transmitted through the ½ wavelength plate 30, its polarization plane spins around by 90 degrees. Therefore, the polarization plane of the transmitted light beam LT is directed in the same direction (the direction orthogonal relative to the figure) as that of the reflected light beam LR reflected from the polarization split film M.

In this manner, the incident light LI incident on the polarization split film M, which is natural light or light in a random polarization state, is converted into light beams of a single polarization state. The converted light beams exit the polarization split film array.

In the example illustrated in FIG. 16A, the polarization plane of the transmitted light beam LT that has transmitted through the polarization split film M is spun around by 90 degrees by the ½ wavelength plate 30; however, the present invention is not limited thereto. The reflected light beam LR that has been reflected from the polarization split film M can be incident on the ½ wavelength plate 30 so that its polarization plane is spun around by 90 degrees in such a manner as to be in the same direction as that of the transmitted light beam LT.

In the above example, the tilt angle of the polarization split film M relative to the incidence surface/exit surface is 60 degrees, to which the present invention is not limited. For example, the tilt angle can be a value near 60 degrees, falling in a range of 60±6 degrees.

Figure 16B:
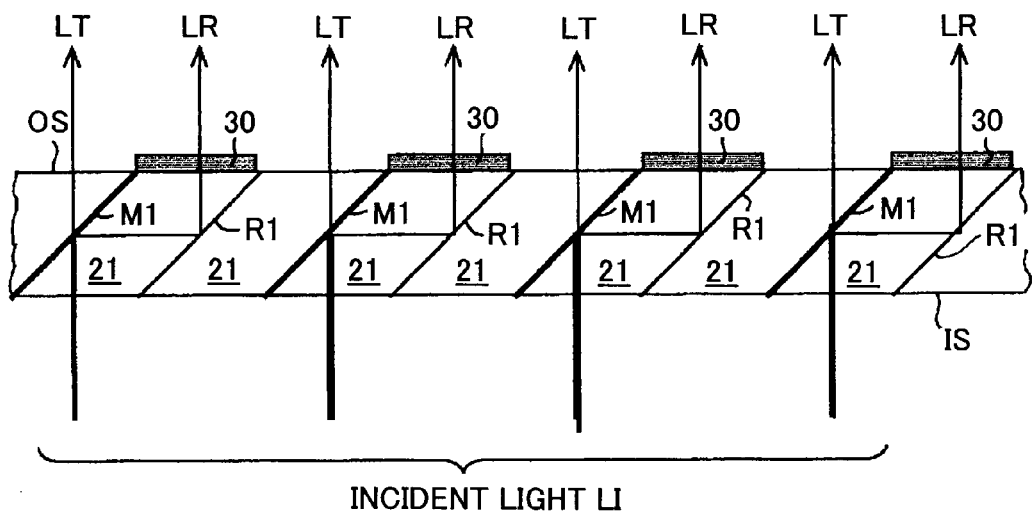

FIG. 16B illustrates a conventional polarization conversion element, in which a polarization split film Ml and a reflection film R1 are tilted by 45 degrees relative to the incidence surface IS and the exit surface OS, and are alternately arranged with transparent substrates 21 interposed therebetween.

The incident light LI incident on the polarization split film Ml, which is natural light or light in a random polarization state, undergoes polarization splitting according to respective polarization components, and is split into a transmitted light beam LT and a reflected light beam LR. The reflected light beam LR is reflected from the reflection film R1 adjacent to the polarization split film Ml, and its polarization plane is spun around by 90 degrees by the ½ wavelength plate 30 in such a manner as to be in the same direction as that of the transmitted light beam LT. Accordingly, the polarization planes of the output light beams are made to be in the same direction.

Comparing the conventional polarization conversion element shown in FIG. 16B and the polarization conversion element according to an embodiment of the present invention shown in FIG. 16A, the polarization conversion element according to an embodiment of the present invention does not require the reflection film R1. For this reason, the polarization conversion element according to an embodiment of the present invention only requires half as many laminated layers of transparent substrates as that of the conventional polarization conversion element, and thus has a simple configuration and has advantageous manufacturability.

According to one embodiment of the present invention, a polarization beam splitter for polarization-splitting incident light is provided.

The polarization beam splitter is effective when light to undergo polarization-splitting has an incidence angle that falls in a range of 54 degrees through 66 degrees.

Generally, according to Brewster's conditions, the best polarization splitting properties can be attained when the incidence angle is around 54 degrees through 60 degrees. An embodiment of the present invention effectively utilizes this fact. That is, the polarization beam splitter according to an embodiment of the present invention is effective, i.e., has favorable polarization splitting properties, with respect to light incident at an incident angle range near Brewster's conditions.

The polarization beam splitter has favorable polarization splitting properties when the incidence angle falls in a range of 54 degrees through 66 degrees. Therefore, when the incident light is highly collimated, the incident light can be arbitrarily set to have an incidence angle that falls in a range of 54 degrees through 66 degrees.

Furthermore, it is considered that there may be a slight degree of direction dispersion in incident light applied to the polarization beam splitter. For example, if the incidence angle is dispersed within a range of ±Δθ, and the dispersion range is within ±6 degrees, by making a setting such that a reference incidence angle of light applied to the polarization beam splitter is 60 degrees, a favorable polarization splitting function can be realized for light applied at an incidence angle within a range of 60±6 degrees.

The polarization beam splitter includes a pair of transparent substrates, and between the pair of transparent substrates are sandwiched an adhesive layer, two or more types of dielectric multilayer films, and a single-layer dielectric film.

The adhesive layer is for adhering to a first transparent substrate of the two transparent substrates.

The two or more types of dielectric multilayer films have different design basis wavelengths.

Each of the two or more types of dielectric multilayer films includes high refractive index films and mid refractive index films each having an optical thickness in accordance with the corresponding design basis wavelength. The high refractive index films and the mid refractive index films are alternately laminated to form an even number of layers. Because an even number of laminated layers are formed in each dielectric multilayer film, one of the dielectric films at the ends of each dielectric multilayer film is a high refractive index film and the other one is a mid refractive index film.

The single-layer dielectric film is provided on a side of the adhesive layer of the dielectric multilayer film provided on the side of the adhesive layer, among the two or more types of dielectric multilayer films. The single-layer dielectric film is the same (has the same composition and thickness as) as one of the films corresponding to a first layer (the layer of the dielectric film disposed furthest from the adhesive layer) in the dielectric multilayer film provided on the side of the adhesive layer.

The two or more types of dielectric multilayer films and the single-layer dielectric film form a polarization split film, which performs a polarization split function with respect to light that substantially includes the visible wavelength region.

Supplementary descriptions are given below. The two or more types of dielectric multilayer films are formed by sequentially depositing and laminating layers on one of the two transparent substrates. On top of the dielectric multiyear film formed last, the single-layer dielectric film is deposited.

The single-layer dielectric film has the same composition and thickness as one of the films corresponding to a first layer in the dielectric multilayer film formed last.

The shape of the transparent substrates can be parallel plates, to which the present invention is not limited. The shape of the transparent substrates can be a triangular prism or a trapezoidal prism having base angles set to be the same as the incidence angle.

The light to undergo polarization-splitting is incident on the polarization split film via the incident one of the transparent substrates between which the polarization split film is sandwiched. Thus, the incidence angle corresponds to the angle at the incidence surface of the incident transparent substrate. Accordingly, if the incidence angle is set to be, for example 54 degrees for light applied to an incidence surface, which is the side surface (the oblique surface) of the incident transparent substrate having a trapezoidal cross-sectional shape with base angles of 60 degrees, the incidence angle at the polarization split film will be less than 54 degrees according to the function of refraction of the transparent substrate.

The high refractive index of the high refractive index films is what is generally defined as a high refractive index, i.e., greater than or equal to 2.0. The mid refractive index of the mid refractive index films falls in a range of around 1.56 through 1.75, which is between what is generally defined as a high refractive index and what is generally defined as a mid refractive index.

Among the two transparent substrates of the polarization beam splitter, at least a second transparent substrate, on which one of the dielectric multilayer films is deposited (the transparent substrate that is not adhered by the adhesive layer), is preferably made of optical glass having a refractive index that falls in a range of 1.46 through 1.58.

In the dielectric multilayer films having different design basis wavelengths, the high refractive index films are made of $Nb_2O_5$ and the mid refractive index films are made of a mixture of $Nb_2O_5$ and $SiO_2$. A refractive index of each of the mid refractive index films in the dielectric multilayer films having different design basis wavelengths is adjusted by a mixture ratio of $Nb_2O_5$ and $SiO_2$. Furthermore, the optical thickness of each of the high refractive index films and each of the mid refractive index films in the dielectric multilayer films having different design basis wavelengths can be set to be $\lambda/4$ with respect to a design basis wavelength $\lambda$.

A number of laminated layers in each of the two or more types of dielectric multilayer films in the polarization beam splitter preferably falls in a range of 8 through 20, more preferably in a range of 12 through 16. The number of laminated layers can be more than 20 in consideration of the polarization splitting function. However, a dielectric multilayer film including 20 or more layers requires a long time to form, which decreases the efficiency in manufacturing polarization beam splitters. Therefore, 20 layers is an appropriate number in consideration of manufacturing costs.

In the above polarization beam splitter, the two or more types of dielectric multilayer films and the single-layer dielectric film are sandwiched between two sandwich-use mid refractive index films. Each of the sandwich-use mid refractive index films is preferably made of a mixture of $Nb_2O_5$ and $SiO_2$ and has a different refractive index from those of the mid refractive index films in the dielectric multilayer films. An optical thickness of each of the sandwich-use mid refractive index films is preferably set to be $\lambda/4$ with respect to a wavelength $\lambda$ that is different from any of the design basis wavelengths of the two or more types of dielectric multilayer films.

In the above polarization beam splitter, three types of the dielectric multilayer films and the single-layer dielectric film are sandwiched between the two transparent substrates. The design basis wavelengths of the three types of dielectric multilayer films can be set to be $\lambda1=610$ [nm], $\lambda2=830$ [nm], and $\lambda3=940$ [nm], respectively. The three types of the dielectric multilayer films and the single-layer dielectric film are sandwiched between sandwich-use mid refractive index films. The wavelength $\lambda$ that defines the optical thickness of each of the sandwich-use mid refractive index films preferably is set to be 840 nm.

In the above polarization beam splitter, each of the three types of dielectric multilayer films having the design basis wavelengths of $\lambda1=610$ [nm], $\lambda2=830$ [nm], and $\lambda3=940$ [nm], respectively, can have 14 laminated layers.

In the above polarization beam splitter, the numbers of layers in the three types of dielectric multilayer films can be changed. A polarization split film that is applicable for practical use can be attained if the numbers are a combination of at least 6 laminated layers in the dielectric multilayer film having the design basis wavelength of $\lambda1=610$ [nm] and at least 6 laminated layers in the dielectric multilayer film having the design basis wavelength of $\lambda2=830$ [nm] and the dielectric multilayer film having the design basis wavelength of $\lambda3=940$ [nm] added together, more preferably a combination of at least 8 laminated layers in the dielectric multilayer film having the design basis wavelength of $\lambda1=610$ [nm] and at least 10 laminated layers in the dielectric multilayer film having the design basis wavelength of $\lambda2=830$ [nm] and the dielectric multilayer film having the design basis wavelength of $\lambda3=940$ [nm] added together.

The optical thickness of each of the high refractive index films, the mid refractive index films, and the sandwich-use mid refractive index films corresponds to the product of the thickness of the film itself (physical thickness) and the refractive index of the film component.

In the above polarization beam splitter, the high refractive index films are made of $Nb_2O_5$ and the mid refractive index films are made of a mixture of $Nb_2O_5$ and $SiO_2$. The high refractive index films are deposited by performing Nb reactive sputtering. The mid refractive index films are deposited by simultaneously performing Si reactive sputtering and Nb reactive sputtering.

The refractive index of the mid refractive index film can be adjusted by adjusting the magnitude relationship of the intensity of Si sputtering and the intensity of Nb sputtering when Si reactive sputtering and Nb reactive sputtering are simultaneously performed to form the mid refractive index film. $Nb_2O_5$ has a high refractive index of around 2.34 and $SiO_2$ has a low refractive index of around 1.43.

When Si reactive sputtering and Nb reactive sputtering are simultaneously performed, $SiO_2$ and $Nb_2O_5$ are simultaneously generated by reaction. Components of the deposited film become a mixture of $Nb_2O_5$ and $SiO_2$. Thus, by adjusting the magnitude relationship of the intensity of Si sputtering and the intensity of Nb sputtering, and by controlling the mixture ratio of $SiO_2$ and $Nb_2O_5$ that are film components, it is possible to realize an arbitrary refractive index between 1.43 through 2.34.

The mid refractive index film is adjusted to literally have a mid refractive index (e.g., around 1.56 through 1.75). Thus, the magnitude relationship of the intensity of Si sputtering and the intensity of Nb sputtering is adjusted in such a manner as to realize such a designed mid refractive index.

Meanwhile, the high refractive index film made of $Nb_2O_5$ can be formed by generating $Nb_2O_5$ by Nb reactive sputtering and depositing the generated $Nb_2O_5$ as a film. With reactive sputtering, $Nb_2O_5$ is primarily generated; however, the generated substance is not 100% $Nb_2O_5$. A slight amount of a substance that is different from but similar to $Nb_2O_5$ will be simultaneously generated.

Therefore, the components in the actually deposited high refractive index film are not purely $Nb_2O_5$, but a small amount of the different type of substance may be incorporated. Furthermore, the filling density of the film is irregular. Therefore, the refractive index of the high refractive index film made of $Nb_2O_5$ changes in a range of around 2.07 through 2.34. However, by adjusting the depositing conditions to attain a constant refractive index, the refractive index of the high refractive index film can be controlled to be at a constant level with favorable reproducibility. Accordingly, such a different type of substance will not have adverse effects on the high refractive index film.

In the above polarization beam splitter, the pair of transparent substrates can be made of BK7.

A polarization conversion element according to an embodiment of the present invention includes plural of any of the above-described polarization beam splitters stacked in multiple tiers, thereby forming a polarization split film array. The polarization split films that are parallel and adjacent to each other share a common one of the transparent substrates. The shared transparent substrates are cut along planes that are parallel to each other to form cut surfaces, each of the cut surfaces being at an angle of substantially 60 degrees relative to the polarization split films. The polarization split films parallel to each other are provided in close contact to or near each other when viewed from directions orthogonal to the cut surfaces. Incident light to undergo polarization-splitting is applied to the polarization split film array from one of the cut surfaces acting as an incidence surface. The incident light is split into transmitted light and reflected light at each of the polarization split films according to respective polarization components, and the reflected light is reflected from an adjacent one of the polarization split films, in such a manner that light, which exits at another one of the cut surfaces acting as an exist surface, propagates in the same direction as that of the incident light. One-half wavelength plates are provided on the other one of the cut surfaces acting as the exit surface at portions from which the transmitted light or the reflected light exit, thereby attaining light having a single polarization state.

In the above polarization conversion element, all of the polarization split films are tilted by 60 degrees relative to at least one of the incidence surface and the exit surface, and the polarization split films are provided in close contact to each other when viewed from at least one of an incidence direction and an exit direction.

The present invention is not limited to the specifically disclosed embodiment, and variations and modifications may be made without departing from the scope of the present invention.

The present application is based on Japanese Priority Patent Application No. 2006-356390, filed on Dec. 28, 2006 and Japanese Priority Patent Application No. 2007-266540, filed on Oct. 12, 2007, the entire contents of which are hereby incorporated by reference.

What is claimed is:

1. A polarization beam splitter for polarization-splitting incident light when light to undergo polarization-splitting has an incidence angle that falls in a range of 54 degrees through 66 degrees, the polarization beam splitter comprising, between two transparent substrates:

an adhesive layer configured to adhere to one of the two transparent substrates;

two or more types of dielectric multilayer films each having a different corresponding design basis wavelength, the two or more types of dielectric multilayer films each including high refractive index films and mid refractive index films, the high refractive index films and mid refractive index films each having an optical thickness in accordance with the corresponding design basis wavelength and being alternately laminated to form an even number of layers;

a single-layer dielectric film, the single-layer dielectric film contacting a last layer in a last of the two or more types of dielectric multilayer films, the single-layer dielectric film being the same as a first layer in the last of the two or more types of dielectric multilayer films;

two sandwich-use mid refractive index films, the two or more types of dielectric multilayer films and the single-layer dielectric film being sandwiched between the two sandwich-use mid refractive index films, the sandwich-use mid refractive index films each having an optical thickness corresponding to a wavelength $\lambda$ that is distinct from any of said design basis wavelengths; and the two or more types of dielectric multilayer films and the single-layer dielectric film and the two sandwich-use mid refractive index films form a polarization split film, which performs a polarization split function with respect to light that is substantially in the visible wavelength region.

2. The polarization beam splitter according to claim 1, wherein:

among the two transparent substrates, at least one transparent substrate, on which one of the dielectric multilayer films is deposited, is made of optical glass having a refractive index that falls in a range of 1.46 through 1.58.

3. The polarization beam splitter according to claim 2, wherein:

the high refractive index films are made of $Nb_2O_5$ and the mid refractive index films are made of a mixture of $Nb_2O_5$ and $SiO_2$;

a refractive index of each of the mid refractive index films is adjusted by a mixture ratio of $Nb_2O_5$ and $SiO_2$; and the optical thickness of each of the high refractive index films and each of the mid refractive index films is set to be $\lambda/4$ with respect to the corresponding design basis wavelength $\lambda$.

4. The polarization beam splitter according to claim 3, wherein:

a number of laminated layers in each of the two or more types of dielectric multilayer films falls either in a range of 8 through 20 or in a range of 12 through 16.

5. The polarization beam splitter according to claim 3, wherein:

each of the sandwich-use mid refractive index films is made of a mixture of $Nb_2O_5$ and $SiO_2$ and has a different refractive index from those of the mid refractive index films in the dielectric multilayer films, and the optical thickness of each of the sandwich-use mid refractive index films is set to be $\lambda/4$ with respect to the wavelength $\lambda$ that is distinct from any of said design basis wavelengths.

6. The polarization beam splitter according to claim 3 including:

three types of the dielectric multilayer films; and the design basis wavelengths of the three types of dielectric multilayer films are $\lambda 1=610$ [nm], $\lambda 2=830$ [nm], and $\lambda 3=940$ [nm], respectively.

7. The polarization beam splitter according to claim 6, wherein:
   each of the sandwich-use mid refractive index films is made of a mixture of $Nb_2O_5$ and $SiO_2$ and has a different refractive index from those of the mid refractive index films in the dielectric multilayer films, and the optical thickness of each of the sandwich-use mid refractive index films is $\lambda/4$ with respect to the wavelength $\lambda$ that is distinct from any of said design basis wavelengths; and
   the wavelength $\lambda$ that defines the optical thickness of each of the sandwich-use mid refractive index films is set to be 840 nm.

8. The polarization beam splitter according to claim 6, wherein:
   each of the three types of dielectric multilayer films includes 14 laminated layers.

9. The polarization beam splitter according to claim 6, wherein:
   a number of layers in the three types of dielectric multilayer films is either a combination of at least 6 laminated layers in the dielectric multilayer film having the design basis wavelength of $\lambda 1$ and at least 6 laminated layers in the dielectric multilayer film having the design basis wavelength of $\lambda 2$ and the dielectric multilayer film having the design basis wavelength of $\lambda 3$ added together, or a combination of at least 8 laminated layers in the dielectric multilayer film having the design basis wavelength of $\lambda 1$ and at least 10 laminated layers in the dielectric multilayer film having the design basis wavelength of $\lambda 2$ and the dielectric multilayer film having the design basis wavelength of $\lambda 3$ added together.

10. The polarization beam splitter according to claim 3, wherein:
    the mid refractive index films are deposited by simultaneously performing Si reactive sputtering and Nb reactive sputtering; and
    the high refractive index films are deposited by performing Nb reactive sputtering.

11. The polarization beam splitter according to claim 1, wherein:
    the two transparent substrates are made of BK7.

12. A polarization conversion element wherein:
    plural polarization beam splitters according to claim 1 are stacked in multiple tiers, thereby forming a polarization split film array;
    the polarization split films that are parallel and adjacent to each other share a common one of the transparent substrates;
    the shared transparent substrates are cut along planes that are parallel to each other to form cut surfaces, each of the cut surfaces being at an angle of substantially 60 degrees relative to the polarization split films;
    the polarization split films parallel to each other are provided in close contact to or near each other when viewed from directions orthogonal to the cut surfaces;
    incident light to undergo polarization-splitting is applied to the polarization split film array from one of the cut surfaces acting as an incidence surface;
    the incident light is split into transmitted light and reflected light at each of the polarization split films according to respective polarization components, and the reflected light is reflected from an adjacent one of the polarization split films, in such a manner that light, which exits another one of the cut surfaces acting as an exist exit surface, propagates in the same direction as that of the incident light; and
    ½ wavelength plates are provided on said other one of the cut surfaces acting as the exit surface at portions from which the transmitted light or the reflected light exit, thereby attaining light having a single polarization state.

13. The polarization conversion element according to claim 12, wherein:
    all of the polarization split films are tilted by 60 degrees relative to at least one of the incidence surface and the exit surface; and
    the polarization split films are provided in close contact to each other when viewed from at least one of an incidence direction and an exit direction.

14. A method for forming a polarization beam splitter for polarization-splitting incident light when light to undergo polarization-splitting has an incidence angle that falls in a range of 54 degrees through 66 degrees and is substantially in the visible wavelength region, the method comprising:
    adhering an adhesive layer to one of two transparent substrates; forming two or more types of dielectric multilayer films each having a different corresponding design basis wavelength, the two or more types of dielectric multilayer films each including high refractive index films and mid refractive index films, the high refractive index films and mid refractive index films being alternately laminated to form an even number of layers;
    forming the high refractive index films of $Nb_2O_5$; forming the mid refractive index films of a mixture of $Nb_2O_5$ and $SiO_2$;
    mixing the $Nb_2O_5$ and $SiO_2$ in a predetermined mixing ratio;
    setting an optical thickness of each of the high refractive index films and each of the mid refractive index films to $\lambda/4$ with respect to the corresponding design basis wavelength $\lambda$;
    forming a single-layer dielectric film, the single-layer dielectric film contacting a last layer in a last of the two or more types of dielectric multilayer films, the single-layer dielectric film being the same as a first layer in the last of the two or more types of dielectric multilayer films; and
    forming two sandwich-use mid refractive index films, the two or more types of dielectric multilayer films and the single-layer dielectric film being sandwiched between the two sandwich-use mid refractive index films, the sandwich-use mid refractive index films each having an optical thickness corresponding to a wavelength $\lambda$ that is distinct from any of said design basis wavelengths.

15. The method for forming a polarization beam splitter according to claim 14, further comprising:
    depositing the mid refractive index films by simultaneously performing Si reactive sputtering and Nb reactive sputtering; and
    depositing the high refractive index films by performing Nb reactive sputtering.

* * * * *